(12) United States Patent
Takada et al.

(10) Patent No.: US 9,347,384 B2
(45) Date of Patent: May 24, 2016

(54) CONTROL DEVICE FOR INTERNAL COMBUSTION ENGINE

(75) Inventors: Noriyuki Takada, Susono (JP); Shinobu Ishiyama, Numazu (JP); Takashi Ogawa, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/400,067

(22) PCT Filed: May 14, 2012

(86) PCT No.: PCT/JP2012/062329
§ 371 (c)(1),
(2), (4) Date: Nov. 10, 2014

(87) PCT Pub. No.: WO2013/171830
PCT Pub. Date: Nov. 21, 2013

(65) Prior Publication Data
US 2015/0101319 A1      Apr. 16, 2015

(51) Int. Cl.
*F01L 1/34* (2006.01)
*F02D 13/02* (2006.01)
*F01L 1/26* (2006.01)
(Continued)

(52) U.S. Cl.
CPC ............ *F02D 13/0226* (2013.01); *F01L 1/267* (2013.01); *F01N 3/2066* (2013.01); *F02D 13/0234* (2013.01); *F01N 3/0814* (2013.01); *F01N 2430/06* (2013.01); *F01N 2430/10* (2013.01); *F01N 2900/08* (2013.01); *F01N 2900/1614* (2013.01); *F02D 13/0257* (2013.01); *F02D 13/0273* (2013.01); *F02D 35/023* (2013.01); *F02D 41/0002* (2013.01); *F02D 41/0275* (2013.01); *F02D 41/1475* (2013.01);
(Continued)

(58) Field of Classification Search
CPC .... F01L 1/267; F01N 3/0814; F01N 2430/06; F01N 2430/10; F01N 2900/08; F01N 2900/1614; F02D 13/0234; F02D 13/0257; F02D 13/0273; F02D 41/0275; F02D 2200/0806; Y02T 10/18
USPC ................. 60/285, 295, 301, 303; 123/90.15, 123/90.16, 90.17, 90.18
See application file for complete search history.

(56) References Cited

U.S. PATENT DOCUMENTS

| | | | | |
|---|---|---|---|---|
| 5,443,050 A | * | 8/1995 | Hitomi | .................... F02B 37/02 123/492 |
| 6,314,725 B1 | | 11/2001 | Wakui | |
| 2010/0204903 A1 | * | 8/2010 | Nakatani | ............. F02D 13/0203 701/103 |

FOREIGN PATENT DOCUMENTS

| | | |
|---|---|---|
| DE | 10023420 A1 | 11/2000 |
| EP | 1136682 A2 | 9/2001 |

(Continued)

*Primary Examiner* — Thomas Denion
*Assistant Examiner* — Jorge Leon, Jr.
(74) *Attorney, Agent, or Firm* — Kenyon & Kenyon LLP

(57) ABSTRACT

A control device for an internal combustion engine is provided with: a variable valve driving mechanism capable of changing a working angle of an intake valve while keeping a maximum magnitude of lift and opening timing constant; a reduction catalyst which absorbs nitrogen oxide in exhaust during lean combustion and reduces the nitrogen oxide absorbed during rich combustion; and a control unit changing, according to a load on the internal combustion engine, an amount of advance of closing of the intake valve at the time of switching to rich combustion.

5 Claims, 29 Drawing Sheets

(51) Int. Cl.
*F01N 3/20* (2006.01)
*F01N 3/08* (2006.01)
*F02D 41/02* (2006.01)
*F02D 41/14* (2006.01)
*F02D 41/00* (2006.01)
*F02D 35/02* (2006.01)

(52) U.S. Cl.
CPC ... *F02D 2041/001* (2013.01); *F02D 2200/0806* (2013.01); *Y02T 10/18* (2013.01)

(56) References Cited

FOREIGN PATENT DOCUMENTS

| | | |
|---|---|---|
| EP | 1552120 A1 | 7/2005 |
| EP | 1552120 B1 | 7/2009 |
| JP | 10-184418 A | 7/1998 |
| JP | 2002-332902 A | 11/2002 |
| JP | 2006-336659 A | 12/2006 |
| JP | 2009-299655 A | 12/2009 |
| WO | 2004009972 A1 | 1/2004 |

* cited by examiner

CRANK ANGLE

TIMING OF INTAKE VALVE
CLOSING (=IVC)

EXHAUST GAS TEMPERATURE

← RICH          LEAN →

AIR/FUEL RATIO

FIG. 25
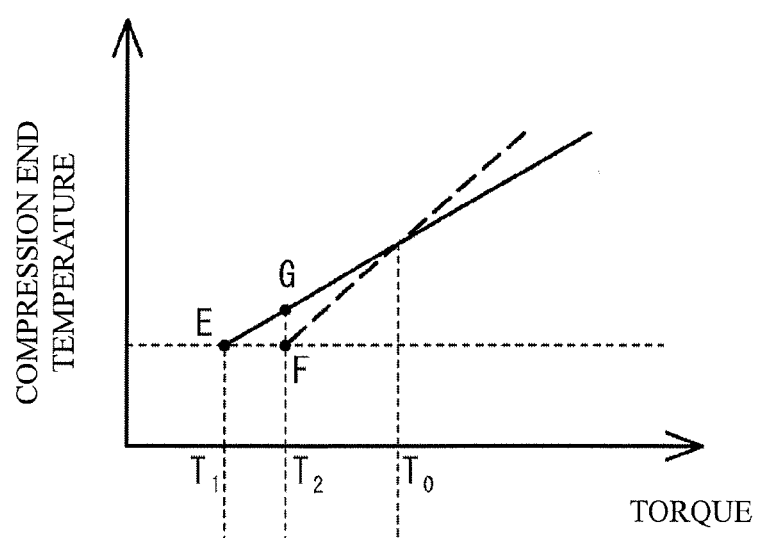
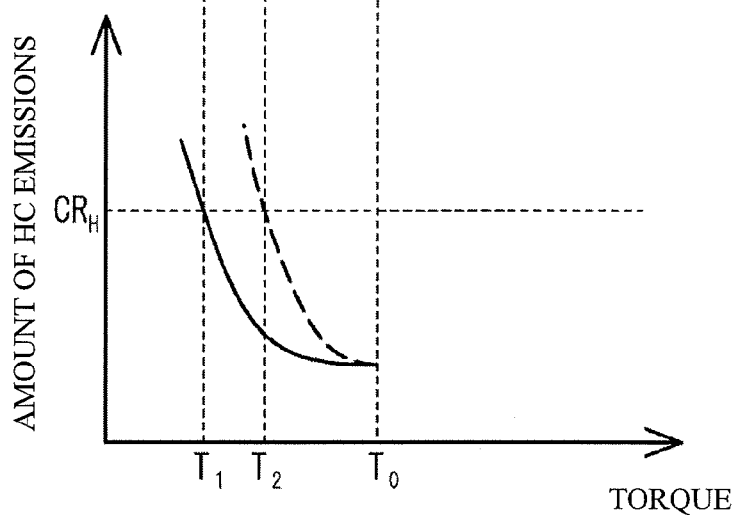
FIG. 26
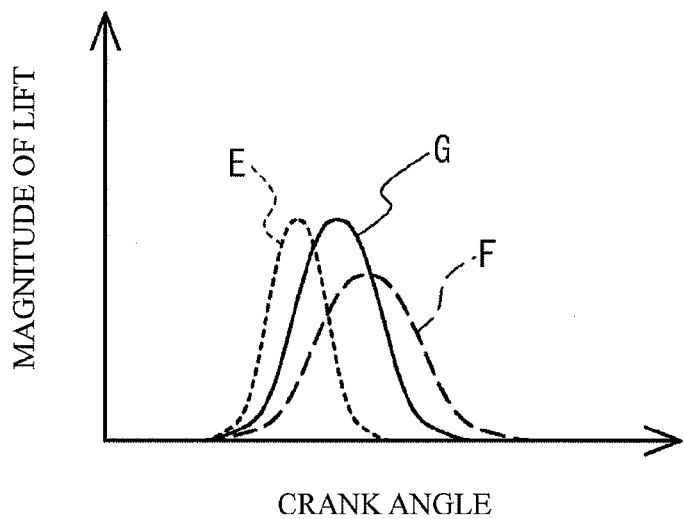

FIG. 27
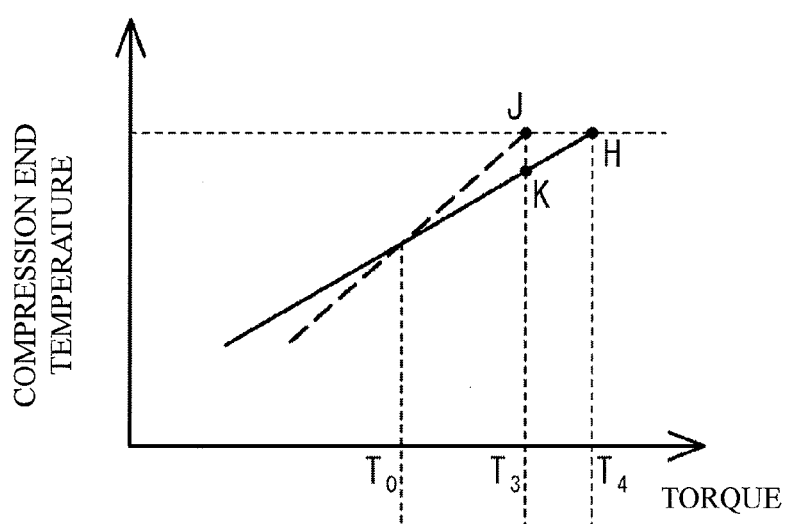
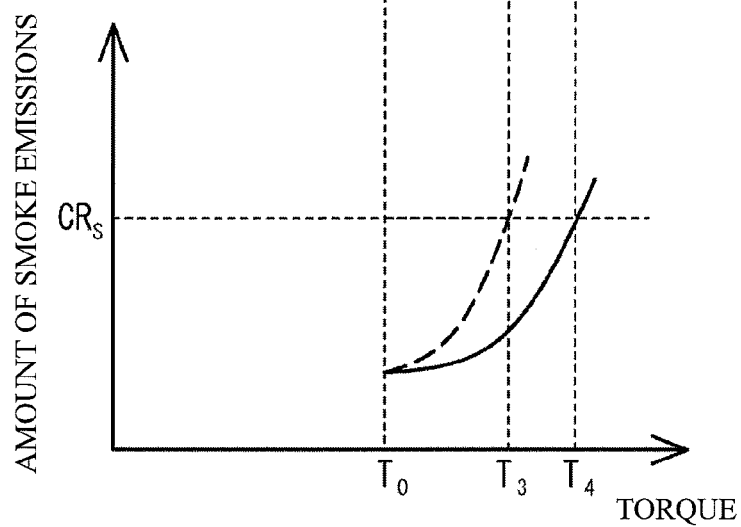
FIG. 28
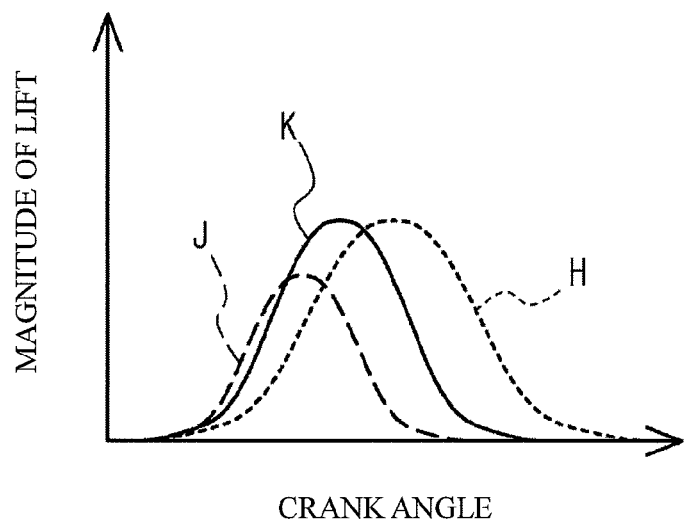

SWIRL

CONTROL DEVICE FOR INTERNAL COMBUSTION ENGINE

CROSS-REFERENCE TO RELATED APPLICATION

This is a national phase application based on the PCT International Patent Application No. PCT/JP2012/062329 filed May 14, 2012, the entire contents of which are incorporated herein by reference.

TECHNICAL FIELD

The present invention relates to a control device for an internal combustion engine.

BACKGROUND ART

There is known a NOx occlusion reduction catalyst device, which absorbs oxides of nitrogen (NOx) included in an exhaust gas of an internal combustion engine and purifies the exhaust gas. The NOx occlusion reduction catalyst device absorbs NOx included in the exhaust gas when the internal combustion engine is operating in a zone in which the air/fuel ratio is lean (during lean combustion). However, the NOx occlusion reduction catalyst device is no longer feasible for absorbing NOx in the exhaust gas when the amount of NOx absorbed reaches a saturated state. In this case, NOx will be emitted into the atmosphere together with the exhaust gas. Thus, a process of regenerating the NOx occlusion reduction catalyst is carried out by temporarily operating the internal combustion engine under fuel excessive conditions (rich combustion), whereby NOx absorbed in the NOx occlusion reduction catalyst device is reduced to nitrogen gas $N_2$.

As to regeneration of NOx occlusion reduction catalyst, Patent Document 1 discloses an art of changing the air/fuel ratio to a rich mixture by reducing the degree of opening of a throttle valve to reduce the amount of intake air introduced into the engine when a rich combustion operation is performed.

In valve driving systems of the internal combustion engines, there is known a variable valve driving mechanism, which changes the period of time during which a cam acts on a valve to change the working angle of the valve. In Patent Document 2, there is disclosed a variable valve driving system of an internal combustion engine in which a control shaft interposed between a cam and a valve is rotated by a drive source, whereby the magnitude of valve lift with respect to the rotational position of the cam is changed and the working angle of the valve is thus changed. In Patent Document 3, there is another variable valve driving system in which an annular disk is interposed between a flange part of a sleeve joined to a drive shaft and a flange part of a camshaft and the rotational center of the annular disk is eccentric to generate unequal velocity rotation to change the working angle of the valve.

PRIOR ART DOCUMENTS

Patent Documents

[Patent Document 1] Japanese Laid-Open Patent Publication No. 10-184418
[Patent Document 2] Japanese Laid-Open Patent Publication No. 2009-299655
[Patent Document 3] Japanese Laid-Open Patent Publication No. 2006-336659

SUMMARY OF THE INVENTION

Problems to be Solved by the Invention

In order to meet a demand for high power and fuel efficiency of the internal combustion engine, it is effective to reduce the real compression ratio. However, in the internal combustion engine that is operated at a reduced real combustion ratio, if rich combustion for regenerating the NOx occlusion reduction catalyst under light load conditions is performed, misfiring occurs and hydrocarbon (HC) emissions are raised. Since an increase of HC emissions results from a decrease of the in-cylinder temperature, a method for increasing the real compression ratio is employed to raise the in-cylinder temperature under the rich combustion conditions. In the method for increasing the real compression ratio, there is a method of advancing the timing of the intake valve closing by the variable valve driving mechanism to make it close to the bottom-dead-center (BDC) position. Besides the structures disclosed in Patent Documents 2 and 3, as another exemplary variable valve driving mechanism, there is a mechanism capable of changing only the phase of the valve without changing the valve working angle.

In a mechanism of changing the valve working angle by changing the magnitude of valve lift as the variable valve driving system disclosed in Patent Document 2, a reduction in the valve working angle inevitably leads to a decrease of the magnitude of valve lift, as illustrated in FIG. 1(a). Thus, the amount of intake air reduces and the in-cylinder pressure decreases, so that only a small effect of increasing the real compression ratio is available. Further, a reduced magnitude of valve lift increases pumping loss of the internal combustion engine.

In the mechanism capable of changing only the phase of the valve without changing the working angle thereof, as illustrated in FIG. 1(b), due to the advance of the valve closing timing, the timing of the valve opening advances, and valve stamp is an issue of concern. Thus, the advance feasible zone is small. Further, the rich conditions in the cylinder are created by adjusting the amount of intake air by the throttle valve, which increases pumping loss and degrades fuel economy.

When the mechanism disclosed in Patent Document 3 is used, it is possible to change of the working angle while keeping the maximum magnitude of valve lift constant, as illustrated in FIG. 1(c). This case is advantageous over the above-described two mechanism because of a wider rich-combustion feasible operation zone. By the way, the internal combustion engine is operating while the air/fuel ratio is changed in response to the magnitude of load. Thus, in regeneration of the NOx occlusion reduction catalyst, even when the timing of the intake valve closing is advanced similarly under low load conditions and high load conditions, rich combustion suitable for the operating conditions is not always obtained.

The present invention aims to provide, in an internal combustion engine that increases the real compression ratio when the combustion is controlled to rich, a control device therefor capable of suitable switching to rich combustion.

Means for Solving the Problems

A control device for an internal combustion engine according to the present invention for solving the above problems is characterized by comprising: a variable valve driving mechanism capable of changing a working angle of an intake valve while keeping a maximum magnitude of lift and opening timing constant; a reduction catalyst which absorbs nitrogen oxide in exhaust during lean combustion and reduces the nitrogen oxide absorbed during rich combustion; and a control unit changing, according to a load on the internal combustion engine, an amount of advance of the timing of closing of the intake valve at the time of switching to rich combustion.

According to the above structure, at the time of switching to rich combustion from normal combustion, the amount of advance is changed according to the magnitude of the load, whereby proper switching that depends on the load is possible. The opening timing of the intake valve is the time when the intake valve that is in the closed state starts opening, and the closing timing is the time when the intake valve is seated to close the flow passage.

In the above control device for the internal combustion engine, the control unit may increase the amount of advance as the load on the internal combustion engine decreases. In the above control device for the internal combustion engine, the control unit may advance the timing of the closing of the intake vale and then increases a fuel injection amount at the time of switching to rich combustion. In the above control device for the internal combustion engine, the variable valve driving mechanism may be capable of changing a phase of the intake valve in addition to changing of the working angle of the intake valve, and the variable valve driving mechanism may maximize lift of the intake valve at a crank angle at which a flow rate of intake air becomes the maximum. Further, the control device for the internal combustion engine may be a control device for an internal combustion engine having two exhaust ports or more per cylinder, and the control device may open one of the two exhaust ports or more located upstream in a swirl flow on an intake stroke during a low-load operation of the internal combustion engine.

Effects of the Invention

According to the present invention, it is possible to provide, in an internal combustion engine that increases the real compression ratio when the combustion is controlled to rich, a control device therefor capable of suitable switching to rich combustion.

BRIEF DESCRIPTION OF THE DRAWINGS

FIG. 25 is a diagram of a compression-end temperature and the amount of HC emissions at low loads in the embodiment and the comparative example, wherein (a) is a diagram of a relationship between torque and the compression-end temperature of the internal combustion engine, and (b) is a diagram of a relationship between torque and the amount of HC emissions;

FIG. 26 is a diagram of lift curves at points E, F and G in (a) of FIG. 25;

FIG. 27 is a diagram of the compression-end temperature and the amount of smoke emissions at high loads in the embodiment and the comparative example, wherein (a) is a diagram of a relationship between torque and the compression-end temperature, and (b) is a diagram of a relationship between torque and the amount of smoke emissions;

FIG. 28 indicates lift curves at points H, J and K in (a) of FIG. 27;

FIGS. 29(a) and 29(b) are diagrams of a comparison between in operation feasible area between the embodiment and the comparative example during rich combustion, wherein FIG. 29(a) is a diagram that indicates the operation feasible area by using torque and the engine speed, and FIG. 29(b) is a diagram that indicates the operation feasible area by using the timing of the closing of the intake valve and torque;

FIGS. 36(a) through 36(c) are diagrams of a comparison between a relationship between torque and the amount of overlap of the embodiment and that of the comparative example, wherein FIG. 36(a) is a diagram of a comparison in the amount of overlap, FIG. 36(b) is a diagram of a comparison in the timing of the opening of the intake valves, and FIG. 36(c) is a diagram of a comparison in the timing of the closing of the exhaust valves;

MODES FOR CARRYING OUT THE INVENTION

A description is given of embodiments of the invention in conjunction with the drawings.

EMBODIMENTS

Figure 1A:
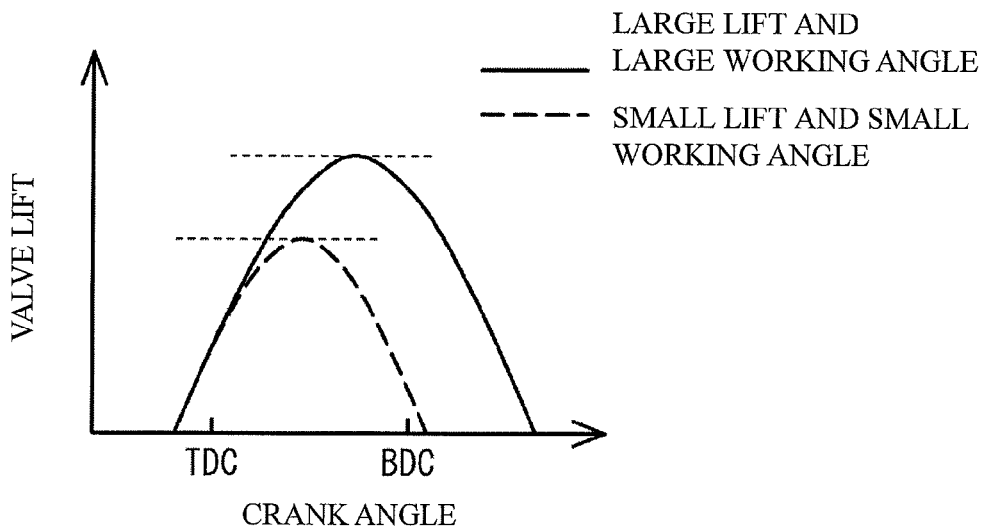
FIGS. 1(a) through 1(c) are diagrams of lift curves of valves by a variable valve driving mechanism, wherein FIG. 1(a) indicates a change of a lift curve by a mechanism that changes the working angle of the valve by changing the magnitude of lift, FIG. 1(b) indicates a change of a lift curve by a mechanism that changes only the phase of the valve, and FIG. 1(c) indicates a change of a lift curve by a mechanism that changes the working angle while keeping the maximum magnitude of lift of the valve constant.
Figure 1B:
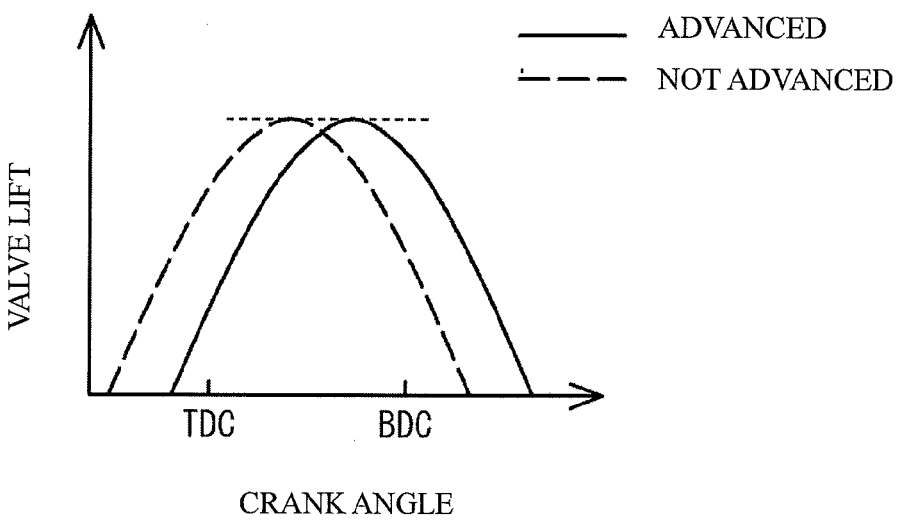
Figure 1C:
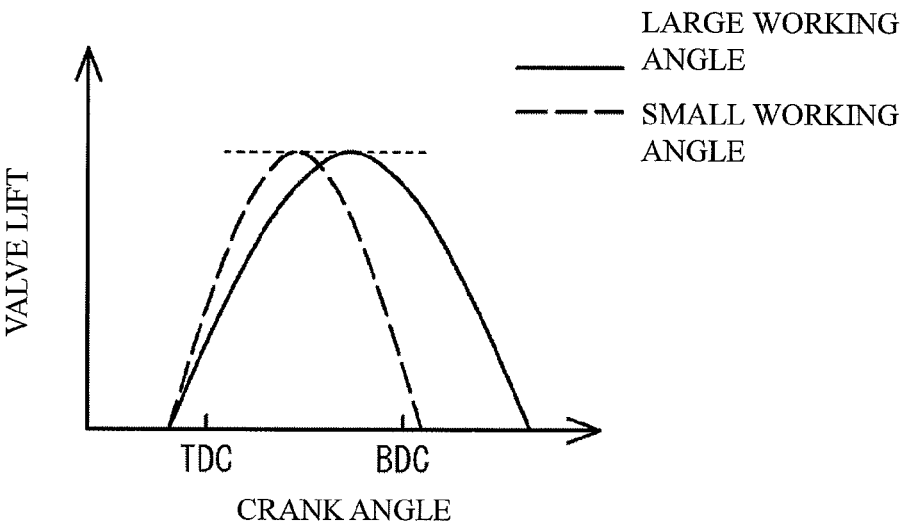
Figure 2:
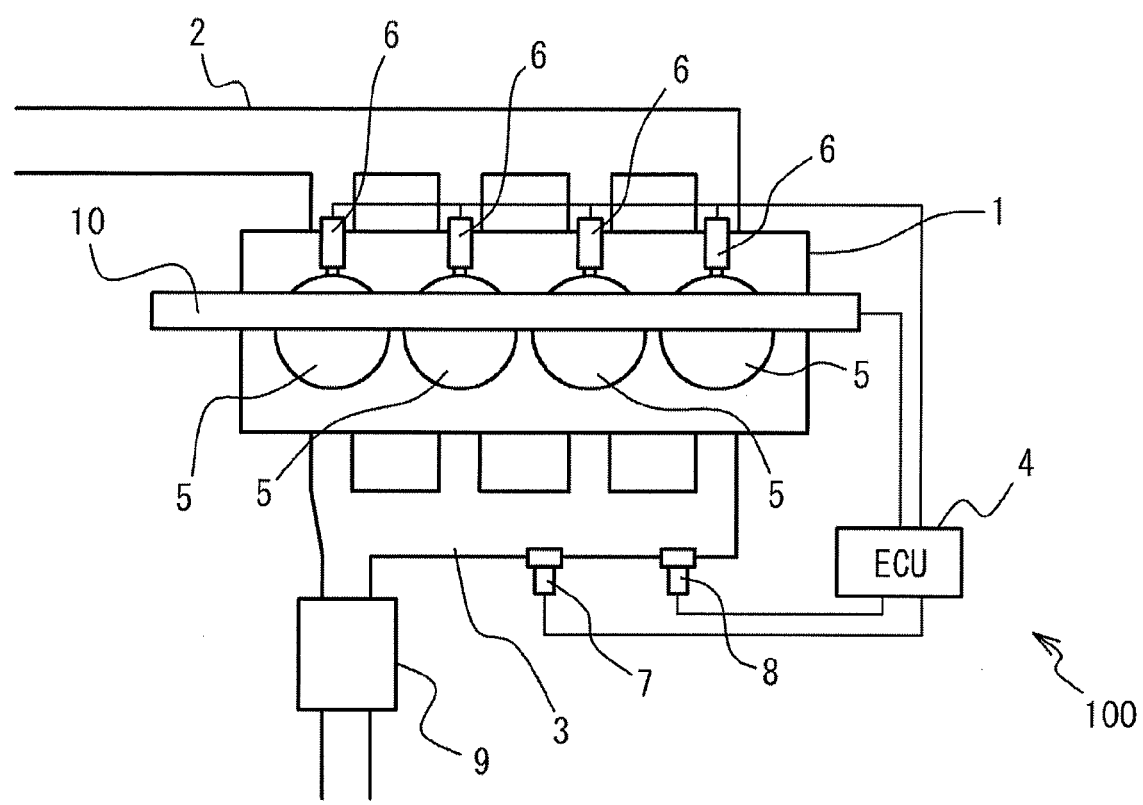
FIG. 2 is a diagram of a control device for an internal combustion engine of an embodiment described in Embodiment 1.

FIG. 2 is a diagram of a control device 100 of an internal combustion engine 1 in accordance with an embodiment. As illustrated in FIG. 2, the internal combustion engine (engine) 1 is equipped with an intake system 2, an exhaust system 3, a variable valve driving mechanism 10, and an ECU (Electronic Control Unit) 4. In the internal combustion engine 1, multiple (four in this embodiment) cylinders 5 are arranged in line. Although the number of cylinders is four in this embodiment, an arbitrary number of cylinders may be employed. Each of the cylinders 5 is provided with a fuel injection valve 6, which injects fuel into the corresponding cylinder 5. In the exhaust system 3, arranged are an exhaust temperature sensor 7 that detects the exhaust gas temperature, and an A/F sensor 8 that detects the air/fuel ratio. The exhaust temperature sensor 7 may be a thermocouple, for example. A reduction catalyst 9 is provided at the downstream sides of the exhaust temperature sensor 7 and the A/F sensor 8 in the exhaust system 3. The reduction catalyst 9 absorbs NOx included in the exhaust gas when fuel is lean-burned, and cleans the exhaust gas. In contrast, when fuel is rich-burned, the reduction catalyst 9 reduces absorbed NOx to nitrogen gas $N_2$, which is then emitted into the atmosphere. When the amount of absorption of NOx reaches a saturated state, the reduction catalyst 9 is no longer capable of absorbing NOx in the exhaust gas. However, the NOx absorption capability is regenerated by rich combustion and is capable of absorbing NOx again.

The variable valve driving mechanism 10 drives intake valves (not illustrated in FIG. 2). The variable valve driving mechanism 10 has a function of changing the working angles of the intake valves while keeping the maximum magnitude of valve lift constant. The ECU 4 is a conventional computer in which a CPU (Central Processing Unit), a RAM (Random Access Memory), a ROM (Read Only Memory) and an input/output port are interconnected by a bi-directional bus, and controls the internal combustion engine 1 while communicating with various sensors and actuators for controlling the internal combustion engine 1. Particularly, in the present embodiment, the ECU 4 is electrically connected to the variable valve driving mechanism 10 and the fuel injection valves 6, and controls structural parts of the variable valve driving mechanism 10 and the fuel injection from the fuel injection valves 6. Further, the ECU 4 is electrically connected to the exhaust temperature sensor 7 and the A/F sensor 8, and acquires the exhaust gas temperature and the A/F ratio detected by these sensors.

Figure 3:
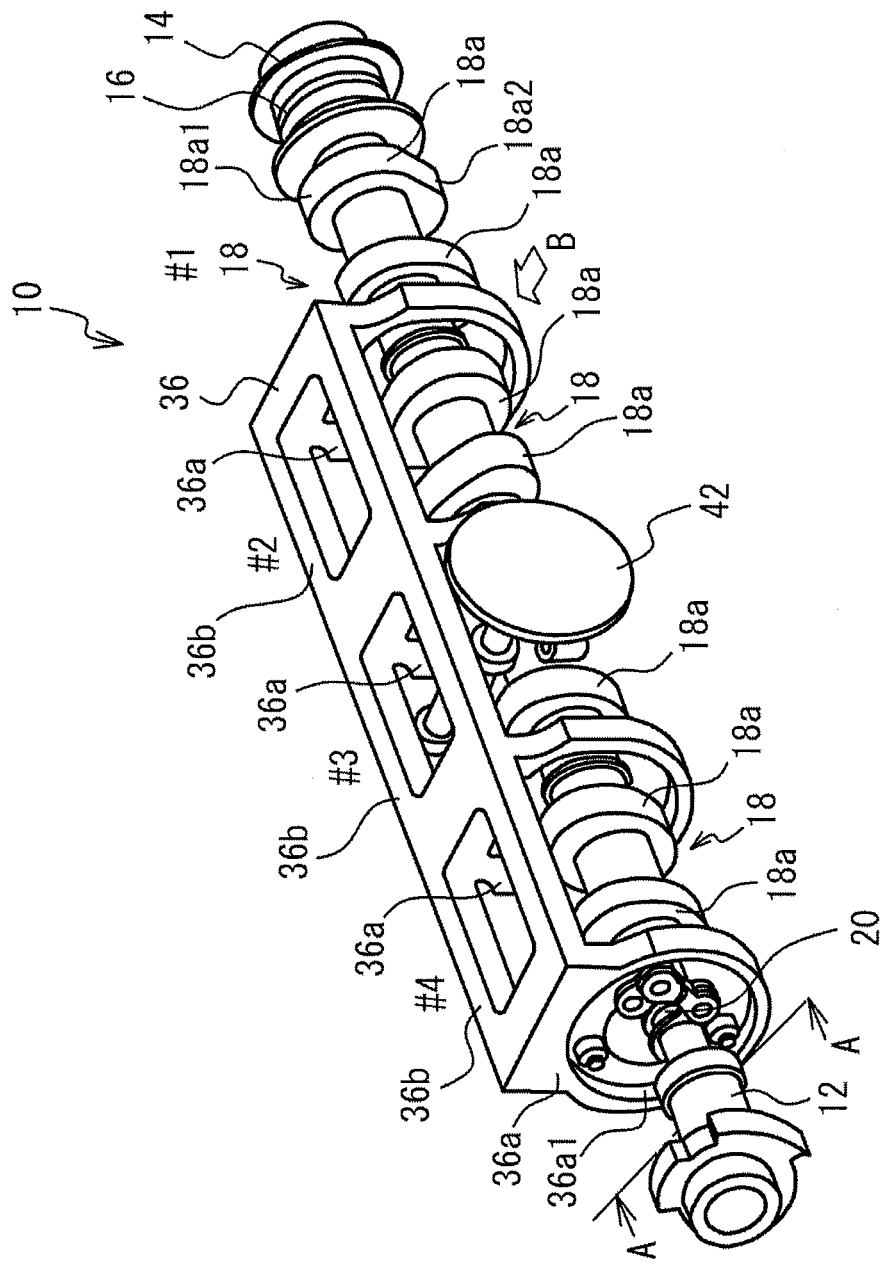
FIG. 3 is a perspective view of the whole structure of a variable valve driving mechanism with which the internal combustion engine is equipped.
Figure 4:
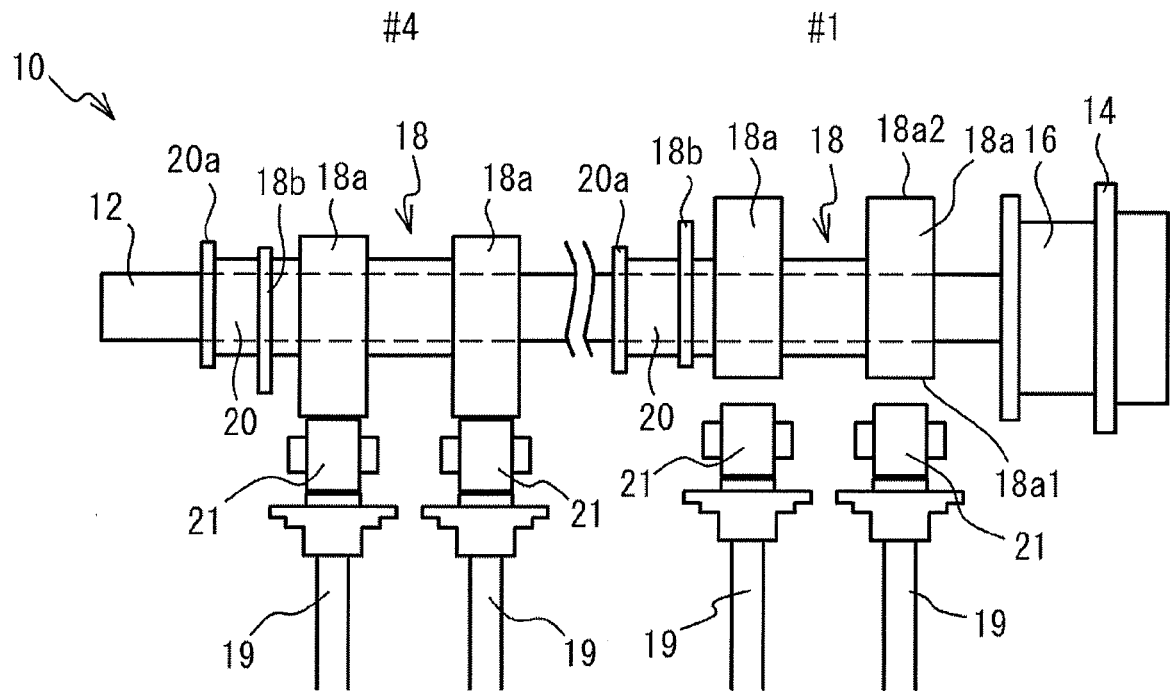
FIG. 4 is a diagram of a structure around a drive camshaft with which the variable valve driving mechanism is equipped.
Figure 5:
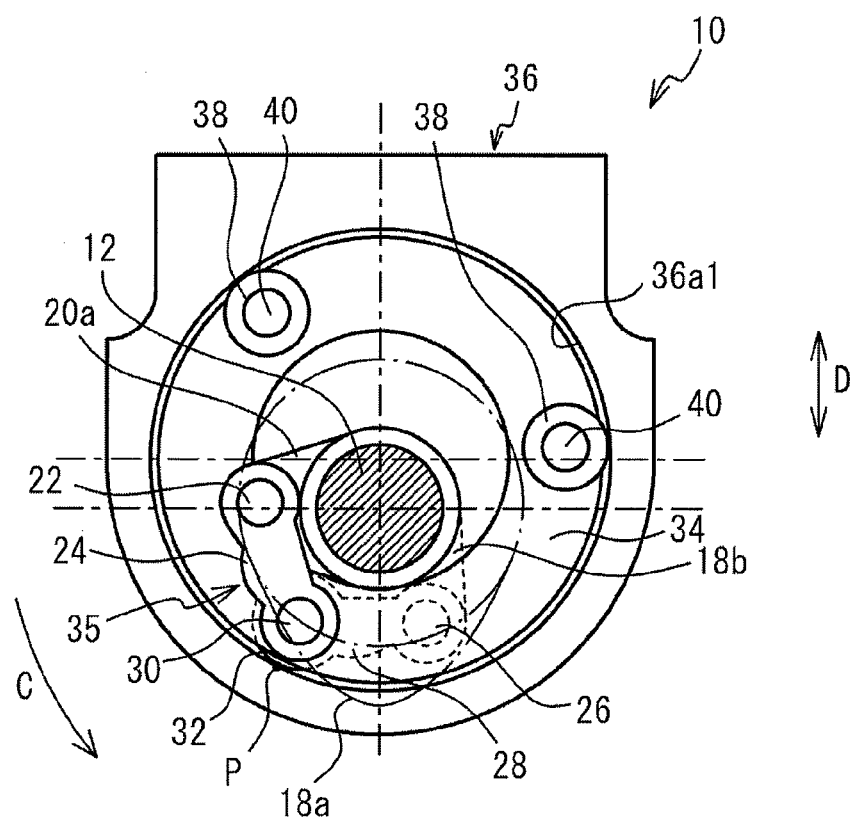
FIG. 5 is a cross-sectional view taken along a line A-A in FIG. 3.
Figure 6:
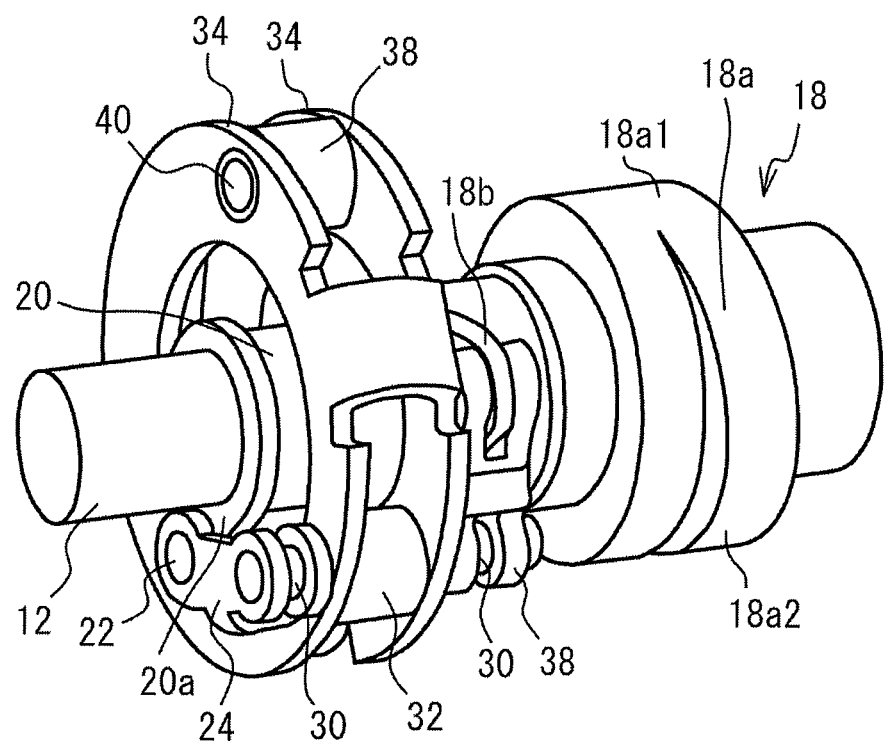
FIG. 6 is a diagram of the variable valve driving mechanism seen from a direction of an arrow B in FIG. 3.
Figure 7:
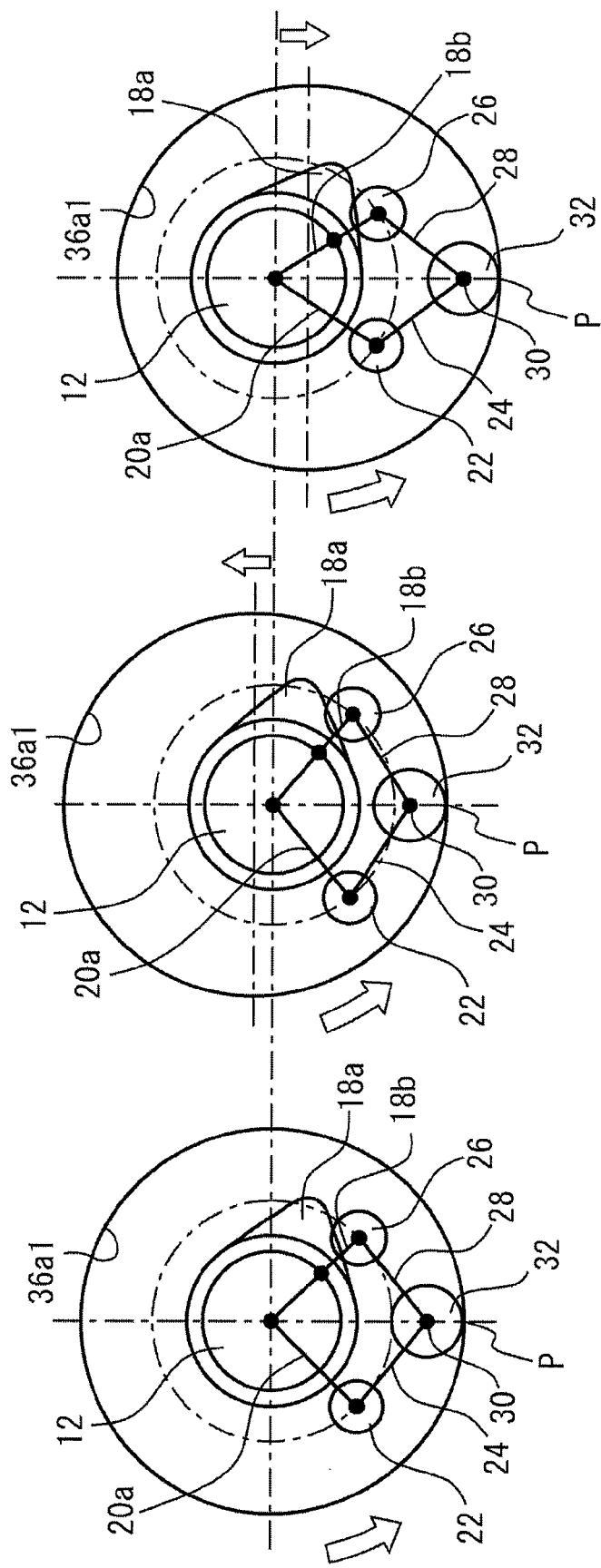
FIG. 7 is a diagram of displacements of a track surface of a guide member of the variable valve driving mechanism, wherein (a) indicates a position of the track surface in a reference state, (b) indicates a position of the track surface when the guide member moves upwards with respect to the reference state, and (c) indicates a position of the track surface when the guide member moves downwards with respect to the reference position.

A detailed description is now given, with reference to FIGS. 3 through 7, of the variable valve driving mechanism 10. FIG. 3 is a perspective view of the whole structure of the variable valve driving mechanism 10. FIG. 4 is a diagram of a structure around a drive camshaft 12 with which the variable valve driving mechanism 10 is equipped. FIG. 5 is a cross-sectional view taken along a line A-A in FIG. 3. FIG. 6 is a diagram of the variable valve driving mechanism 10 viewed from a direction indicated by an arrow b. In FIG. 6, a guide member 36, which will be described later, is omitted for convenience of illustration.

As illustrated in FIGS. 3 and 4, the variable valve driving mechanism 10 is provided with the drive camshaft 12. The drive camshaft 12 is joined to a crankshaft (not illustrated)

through a timing pulley 14 and a timing chain (not illustrated), and rotates at a speed that is half the speed of the crankshaft. As illustrated in FIGS. 3 and 4, a variable valve timing (VVT) mechanism 16 capable of changing the rotation phase of the drive camshaft 12 with respect to the rotation of the crankshaft is interposed between the drive camshaft 12 and the timing pulley 14. The VVT mechanism 16 may have a structure in which a vane that defines rooms that store pressurized oil is rotated by a supply and discharge of the pressurized oil, and the drive camshaft 12 is thus rotated with respect to the timing pulley.

As illustrated in FIGS. 3 and 4, a cam piece 18 is attached to the drive camshaft 12 for each of the cylinders. The cam pieces 18 are concentric to the drive camshaft 12, and are rotatably supported by the drive camshaft 12. Two driven cam lobes 18a for driving valves (not illustrated) are formed in each of the cam pieces 18. Each of the driven cam lobes 18a has a base circle part 18a1 that is concentric to the drive camshaft 12 and is shaped into an arc, and a nose part 18a2 that bulges outwards from a part of the base circle in the radial direction. A rocker arm 21 is provided below the driven cam lobes 18a for each intake valve 19. The intake valve 19 is pushed out at a timing when the nose part 18a2 of the driven cam lobe 18a comes into contact with the rocker arm 21.

A drive arm 20, which has drive arm parts 20a bulging outwards in the radial direction for the respective cylinders, is attached to the drive camshaft 12. The drive arms 20 are integrally attached to the drive camshaft 12 by using predetermined fixing members (not illustrated). Further, driven arm parts 18b that bulge outwards of the drive camshaft 12 are integrally formed in the cam pieces 18 in the vicinity of the driven cam lobes 18a closer to the drive arms 20 in the same cylinders.

As illustrated in FIGS. 5 and 6, an end of a drive link 24 is rotatably joined to each of the drive arm parts 20a via a camshaft-side rotation axis 22. An end of a driven link 28 is rotatably joined to the corresponding driven arm part 18b through a cam-lobe-side rotation shaft 26.

The other end of the drive link 24 and the other end of the driven link 28 are joined together through a control-roller-side rotation shaft 30. A control roller 32 and a link plate 34 are interposed between the drive link 24 and the driven link 28 on the control-roller-side rotation shaft 30. As described above, the variable valve driving mechanism 10 is provided with the drive arm parts 20a and the driven arm parts 18b having the common rotation center that is the axial center of the drive camshaft 12, and link mechanisms 35 joined by the drive links 24 and the driven links 28. The link mechanisms 35 are four-link mechanisms. As illustrated in FIG. 5, in the present embodiment, the driven link 28 is arranged on the forward side of the rotation direction C of the drive camshaft 12 with respect to the drive link 24 in the state in which the control roller 32 is interposed between the driven link 28 and the drive link 24.

As illustrated in FIG. 6, the link plate 34 is formed by bending a plate having two plate parts formed into an annular shape so that the two plate parts are concentric. The link plate 34 is arranged so that the drive camshaft 12 passes through the inside of the link plate 34. Further, the link plate 34 is arranged on the control-roller-side rotation shaft 30 in the state in which the two plate parts of the link plate 34 sandwich the control roller 32.

As illustrated in FIG. 5, at the outer circumferential side of the link plate 34, there is arranged a track surface 36a1 of the guide member 36 so as to cover the link plate 34. The track surface 36a1 is a circumferential surface. The control roller 32 is rotatably supported by the control-roller-side rotation shaft 30 in a position (contact point P) having a contact with the track surface 36a1. Thus, the control roller 32 moves while rotating along the track surface 36a1 in conjunction with the rotation of the drive camshaft 12.

Further, as illustrated in FIG. 5, between the plate parts of the link plate 34, in addition to the control roller 32, there are rotatably attached two hold rollers 38 through hold-use rotation shafts 40 in positions having contacts with the track surface 36a1. With this structure, the position of the link plate 34 in the radial direction of the drive camshaft 12 is defined by the track surface 36a1. Further, the position of the control roller 32 attached to the link plate 34 on the track surface 36a1 is defined. Thus, the control roller 32 moves as the drive camshaft 12 rotates while rolling on the track surface 36a1 in the state in which the control roller 32 is always in contact with the track surface 36a1. As a result of defining the position of the control roller 32, the relative position of the driven cam lobe 18a in the rotation direction joined through the drive link 24 and the driven link 28 is defined.

As illustrated in FIG. 3, the guide member 36 is provided with annular parts 36a having the track surfaces 36a1. The annular parts 36a for the respective cylinders are integrally joined together by bridge parts 36b that bridge between the annular parts 36a. The guide member 36 is supported on a cylinder head (not illustrated) through a predetermined support member (not illustrated). By this, the guide member 36 is structured so as to be movable in directions D indicated by an arrow in FIG. 5 (which correspond to the axial directions of the cylinders of the internal combustion engine 1), and is restrained in the directions orthogonal to the directions D.

Further, as illustrated in FIG. 3, the variable valve driving mechanism 10 is provided with an actuator 42. The actuator 42 moves the guide member 36 in the directions D in FIG. 5 within a predetermined range. More specifically, the actuator 42 moves the guide member 36 so that the center of the track surface 36a1 that is a circumferential surface moves in normal directions of the axial line of the drive camshaft 12 and in the axial directions of the corresponding cylinder. In the above movement, "reference state" is defined as a state in which the center of the track surface 36a1 and the center of the drive camshaft 12 coincide with each other viewed from the axial directions of the drive camshaft 12. The actuator 42 adjusts the movement of the guide member 36 in an arbitrary position within the movable range. The actuator 42 moves the guide member 36 in accordance with an instruction by the ECU 4. The actuator 42 may be composed of a motor and a worm gear, for example.

A description is now given of changes in the moving speed of the driven cam lobe 18a and changes in the working angle of the intake valves 19 in response to movements of the guide member 36. FIGS. 7(a) through 7(c) illustrate displacements of the track surface 36a1 of the guide member 36. FIG. 7(a) illustrates the position of the track surface 36a1 in the reference state. FIG. 7(b) illustrates a position of the track surface 36a1 when the guide member 36 is moved upwards from the reference state. FIG. 7(c) illustrates a position of the track surface 36a1 when the guide member 36 is moved downwards from the reference state.

When the drive camshaft 12 rotates in the rotation direction of the drive camshaft 12, the turning force of the drive camshaft 12 is transmitted to the drive link 24 through the drive arm part 20a integrally fixed to the drive camshaft 12. The turning force of the drive camshaft 12 transmitted to the drive link 24 is transmitted to the driven cam lobe 18a integrally formed with the driven arm part 18b through the control-roller-side rotation shaft 30 and the driven link 28. As described above, the turning force of the drive camshaft 12 is transmitted to the driven cam lobe 18a through the link mechanism 35.

As a result, in synchronism with the rotation of the drive camshaft 12, the elements of the link mechanism 35 and the driven cam lobe 18a rotate in the same direction as that of the drive camshaft 12. In this case, the control roller 32 moves while rolling on the track surface 36a1 in the state in which the control roller 32 always contacts the track surface 36a1 at the contact P, and rotates about the drive camshaft 12.

As illustrated in FIG. 7(a), in the reference state, the center of the drive camshaft 12 and the center of the track surface 36a1 coincide with each other. Thus, the rotation center of the drive camshaft 12 and the rotation center of the control roller 32 coincide with each other while the control roller 32 rotates on the track surface 36a1 once in accordance with the rotation of the drive camshaft 12. That is, in the reference state, the driven cam lobe 18a rotates at the same speed as the drive camshaft 12.

In the state illustrated in FIG. 7(b), the track surface 36a1 has moved upwards (in the direction in which the track surface 36a1 becomes away from the combustion chamber). In this state, the distance between the rotation center of the drive camshaft 12 and the rotation center of the control roller 32 becomes smaller than the distance available in the reference state as the control roller 32 moves towards the position $P_0$ directly below the track surface 36a1 in the approximately lower-half section of the track surface 36a1. As a result, compared to the reference state, the cam-lobe-side rotation shaft 26 moves forward in the rotation direction. This causes the driven arm part 18b to move faster than the drive arm part 20a. That is, the movement speed of the driven cam lobe 18a is increased when the control roller 32 passes through the lower half circle of the track surface 36a1.

In contrast, the state illustrated in FIG. 7(c) shows a state in which the track surface 36a1 has moved downwards (in the direction in which the track surface 36a1 becomes closer to the combustion chamber). In this state, the distance between the rotation center of the drive camshaft 12 and the rotation center of the control roller 32 becomes larger than the distance available in the reference state as the control roller 32 moves towards the position $P_0$ directly below the track surface 36a1 in the approximately lower-half section of the track surface 36a1. As a result, compared to the reference state, the cam-lobe-side rotation shaft 26 moves backward in the rotation direction. This causes the driven arm part 18b to move slower than the drive arm part 20a. That is, the movement speed of the driven cam lobe 18a is decreased when the control roller 32 passes through the lower half circle of the track surface 36a1. As described above, by appropriately controlling the position of the track surface 36a1, it is possible to change the movement speed of the driven cam lobe 18a (that is, the cam piece 18) during one revolution.

Figure 8:
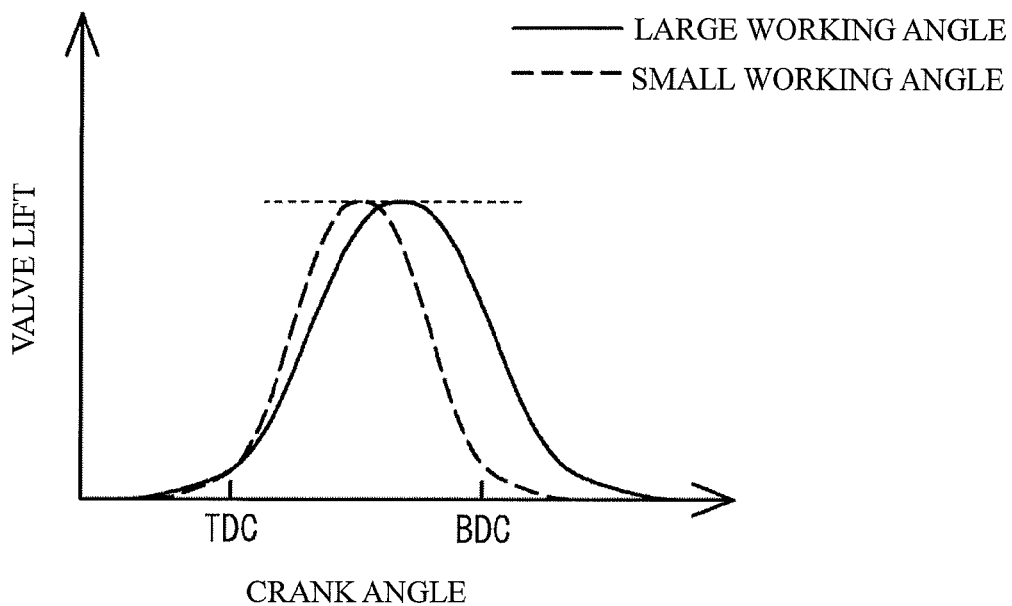
FIG. 8 is a diagram of a lift curve of a first intake valve in the embodiment.

A description is now given of a relationship between the rotation speed of the cam pieces 18 and the lift of the intake valves 19. FIG. 8 is a diagram of a lift curve of the intake valves 19 in the present embodiment. In FIG. 8, a solid line indicates a lift curve when the intake valves 19 have a large working angle, and a broken line indicates a lift curve when the intake valves 19 have a small working angle.

The variable valve driving mechanism 10 is capable of changing the working angles of the intake valves 19 (the intervals from the opening timing to the closing timing) by changing the rotation speeds of the cam pieces 18 while the cam pieces 18 rotate once. That is, the working angles of the intake valves 19 are reduced by increasing the rotation speeds of the cam pieces 18 while the nose parts 18a2 of the cam pieces 18 act on the intake valves 19. In contrast, the working angles of the intake valves 19 are increased by decreasing the rotation speeds of the cam pieces 18 while the nose parts 18a2 of the cam pieces 18 act on the intake valves 19. While the working angles of the intake valves are being changed, the cam lifts of the nose parts 18a2 of the cam pieces 18 do not change, and the maximum magnitude of lift of the intake valves 19 do not change. That is, as illustrated in FIG. 8, the variable valve driving mechanism 10 is capable of changing the working angles while the maximum magnitude of lift of the intake valves 19 is kept constant. The timing of the valve opening is a crank angle at which the intake valve in the closed state starts opening, and the timing of the valve closing is a crank angle at which the intake valve in the open state is seated to close the flow passage.

Figure 9:
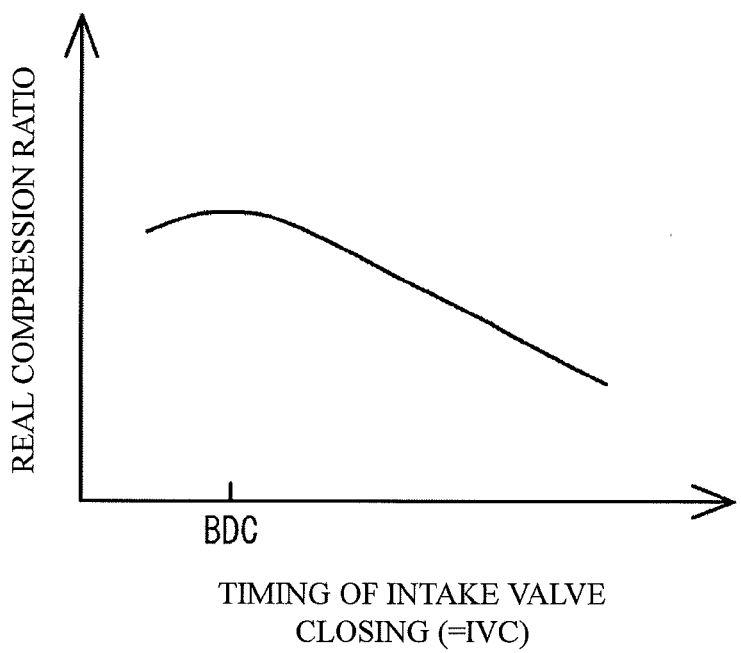
FIG. 9 is a diagram of a relationship between the timing of the intake valve closing and the real compression ratio.

FIG. 9 is a diagram that illustrates a relationship between the timing of the intake valve closing (IVC) and the real compression ratio. As illustrated in FIG. 9, when the timing of the closing of the intake valve 19 of concern is at the bottom-dead-center (BDC) position, the real compression ratio has a maximum value. Thus, when the timing of the closing of the intake valve 19 is after BDC, the real compression ratio becomes higher as the closing timing is made closer to BDC. That is, as the closing timing is earlier, the real compression ratio is higher. The variable valve driving mechanism 10 may change the phase of the duration of the opening by the VVT mechanism 16. The duration of opening is a duration for which the valve is open, and changing of the phase of the duration of the opening means changing of the phase of the opening timing and the phase of the closing timing without changing the interval between the opening timing and the closing timing.

Comparative Example

Figure 10:
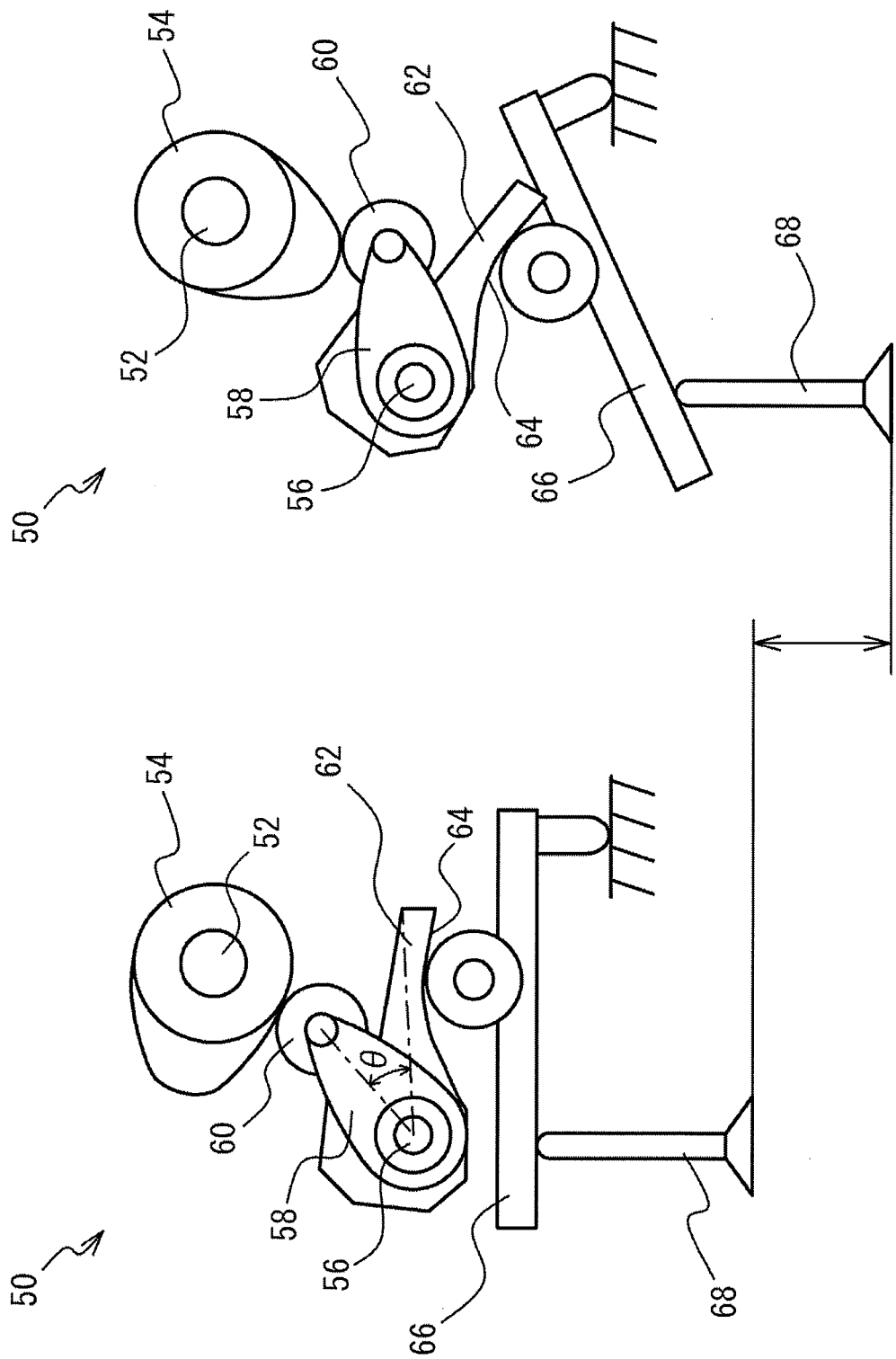
FIG. 10 is a diagram of the variable valve driving mechanism observed when the magnitude of lift of the intake valve is reduced in a comparative example, wherein (a) indicates a state in which the intake valve is closed, and (b) indicates a state in which the intake valve is opened.
Figure 11:
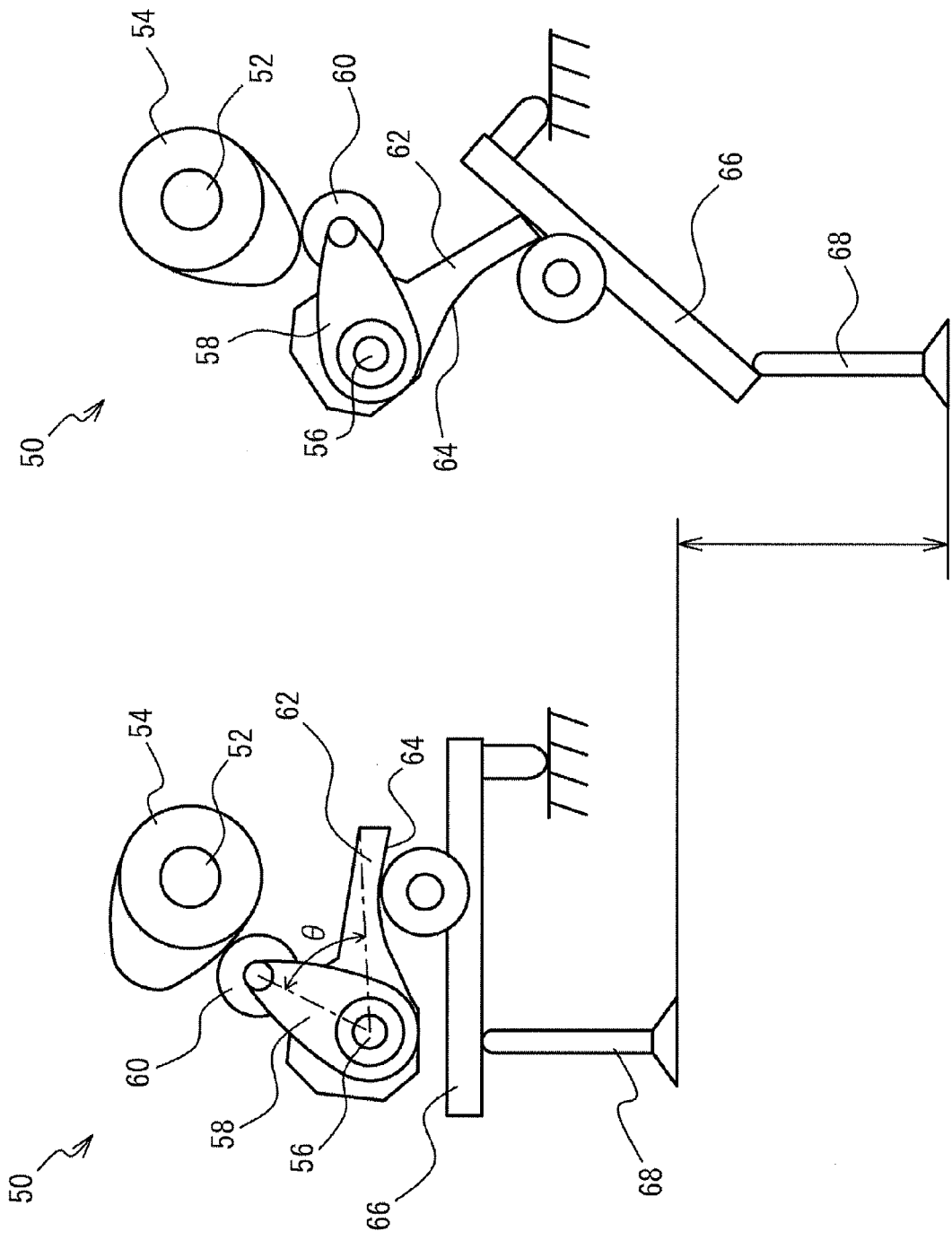
FIG. 11 is a diagram of an outline of a variable valve driving mechanism 50 when the magnitude of lift of the intake valve is increased in the comparative example, wherein (a) indicates a state in which the intake valve is closed, and (b) indicates a state in which the intake valve is opened.

A description is now given of a variable valve driving mechanism 50 of a comparative example. The variable valve driving mechanism 50 of the comparative example changes the working angle of a valve by changing the magnitude of lift of the valve. The variable valve driving mechanism 50 of the comparative example may be mounted in the internal combustion engine 1 instead of the variable valve driving mechanism 10 described in the embodiment. FIGS. 10 and 11 are schematic diagrams of the variable valve driving mechanism 50 of the comparative example. Parts (a) and (b) of FIG. 10 illustrate a structure when the magnitude of lift of an intake valve 68 is set small, and parts (a) and (b) of FIG. 11 illustrate a structure when the magnitude of lift of the intake valve 68 is set large. Parts (a) of FIGS. 10 and 11 illustrate states in which the intake valve 68 is closed, and parts (b) of FIGS. 10 and 11 illustrate states in which the intake valve 68 is open.

The variable valve driving mechanism 50 is provided with a camshaft 52, a control shaft 56 and a rocker arm 66. The camshaft 52 is a shaft joined to the crankshaft (not illustrated) of the internal combustion engine through a timing pulley and a timing chain (both omitted in illustration), and is rotated. A cam 54 is attached to the camshaft 52 for each cylinder. The control shaft 56 is a shaft provided in parallel with the camshaft 52, and a roller arm 58 and a swing arm 62 are attached to the control shaft 56 for each cylinder. A main roller 60 is attached to an end of the roller arm 58. The camshaft 52 and the control shaft 56 are arranged so that the main roller 60 contacts the cam 54. The roller arm 58 and the swing arm 62 are attached to the control shaft 56 so that the relative positions thereof around the control shaft 56 are changeable. A rotation means (not illustrated) for rotating the roller arm 58 relatively with respect to the swing arm 62 is attached to the control shaft 56. The swing arm 62 has a slide surface 64 that is in contact with the rocker arm 66. The rocker arm 66 is arranged to rotate in response to force from the swing arm 62 and drive the intake valve 68.

A description is now given of an opening operation of the intake valves 68 by the variable valve driving mechanism 50. The camshaft 52 rotates, and the main roller 60 is pushed in response to the rotation of the camshaft 52, whereby the roller arm 58 is rotated. The rotation of the roller arm 58 rotates the control shaft 56 and the swing arm 62 attached to the control shaft 56. The rotation of the swing arm 62 acts on the rocker arm 66, whereby the rocker arm 66 is rotated to open the intake valve 68.

Next, a description is given of an operation of the variable valve driving mechanism 50 for changing the magnitude of lift of the intake valves 68. When changing the lift magnitude of the intake valve 68 of concern, the variable valve driving mechanism 50 rotates the roller arm 58 and changes an angle θ formed by the roller arm 58 and the swing arm 62. Here, it is assumed that the timing of the opening of the intake valve 68 is not changed. For example, if the angle θ formed by the roller arm 58 and the swing arm 62 is decreased, as indicated in FIG. 10, the lift magnitude of the intake valve 68 decreases. Further, the timing of the closing of the intake valve 68 advances with a decrease in the lift magnitude, and the working angle of the intake valve 68 is reduced. In contrast, if the angle θ formed by the roller arm 58 and the swing arm 62 is increased, as indicated in FIG. 11, the magnitude of lift of the intake valve 68 is increased. Further, the timing of the closing of the intake valve 68 retards with an increase in the lift magnitude, and the working angle of the intake valve 68 is increased. As described above, the variable valve driving mechanism 50 of the comparative example changes the working angle of the intake valve 68 by changing the lift magnitude of the intake valve 68.

Figure 12:
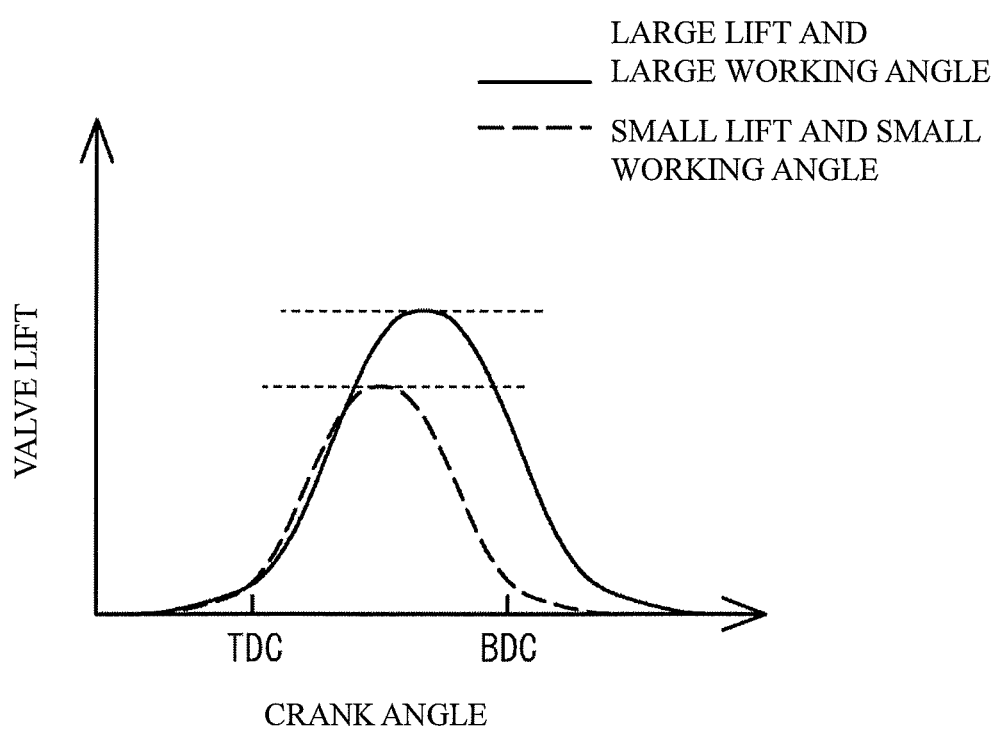
FIG. 12 is a diagram of a lift curve observed when the magnitude of lift of the intake valve is changed by the variable valve driving mechanism of the comparative example.

FIG. 12 is a diagram of lift curves of the intake valve 68 observed when the magnitude of lift is changed by the variable valve driving mechanism 50. In FIG. 12, a solid line indicates a lift curve when the intake valve 68 has a large working angle, and a broken line indicates a lift curve when the intake valve 68 has a small working angle. As illustrated in FIG. 12, as the working angle of the intake valve 68 decreases, the magnitude of lift decreases in the variable valve driving mechanism 50

Embodiment 1

Control in Switching to Rich Combustion

Figure 13:
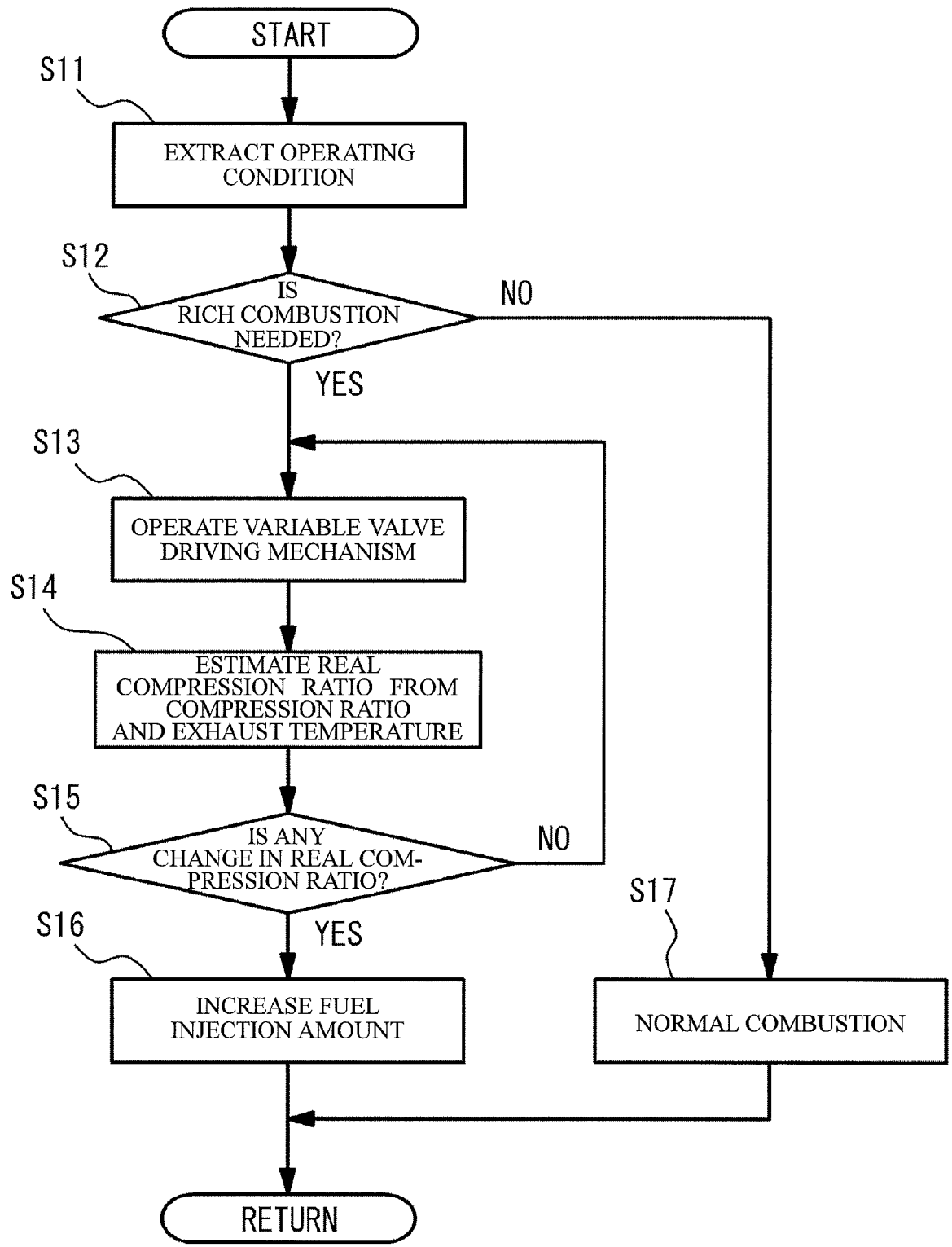
FIG. 13 is a flowchart of a control executed at the time of switching to rich combustion from normal combustion.

Now, a description is given of Embodiment 1 of the present invention. In Embodiment 1, the variable valve driving mechanism 10 changes the working angles of the intake valves 19 while keeping the opening timing constant. The ECU 4 changes the amount of advance of the timing of the closing of the intake valves 19 at the time of switching to rich combustion in accordance with the load on the internal combustion engine. Here, a description will be given of a control executed by the control device 100 of the internal combustion engine in the embodiment when the combustion condition of the internal combustion engine 1 is switched to rich combustion from normal combustion. FIG. 13 is a flowchart of a control executed when switching to rich combustion from normal combustion. This control is executed by the ECU 4. A description is now given, with reference to the flowchart of FIG. 13, of a control executed by the ECU 4.

The present control is periodically or continuously carried out while the internal combustion engine 1 is operating. After starting the control, the ECU 4 looks up at least the accelerator position and the engine speed of the internal combustion engine 1 and identifies the operating condition (step S11). Next, the ECU 4 determines whether rich combustion is required (step S12). A determination as to whether rich combustion is required is made by the amount of NOx absorbed in the reduction catalyst 9. The amount of NOx absorbed may be calculated by, for example, a method using a counter based on the operation time and the running distance, a method using the cumulative time of fuel cut, or another method. From the absorption amount of NOx calculated in this manner, the ECU 4 determines that rich combustion is required if the absorption of NOx reaches the saturated state.

If the ECU 4 makes an affirmative determination in step S12, the ECU 4 operates the variable valve driving mechanism 10 (step S13). The working angles of the intake valves 19 changed by the variable valve driving mechanism 10 are determined on the basis of the real compression ratio that corresponds to an equivalence ratio $\phi$ required. The variable valve driving mechanism 10 changes the timing of the closing of the intake valves 19 to realize the above-described working angles. Although the equivalence ratio $\phi$ required depends on the conditions of the reduction catalyst 9, rich combustion is performed in any case. Thus, the variable valve driving mechanism 10 operates to reduce the working angles in order to reduce the amount of intake air in the cylinders 5. In the present embodiment, since the timing of the intake valve opening (IVO) is kept constant, when the working angles are specified, the timing of intake valve closing (IVC) is determined. The ECU 4 operates the variable valve driving mechanism 10 to realize the determined IVC. At this time, the IVC advances much more than those under normal-burn conditions. The equivalence ratio $\phi$ is obtained by dividing the stoichiometric air/fuel ratio A/Fst by the real air/fuel ratio A/F.

Figure 14A:
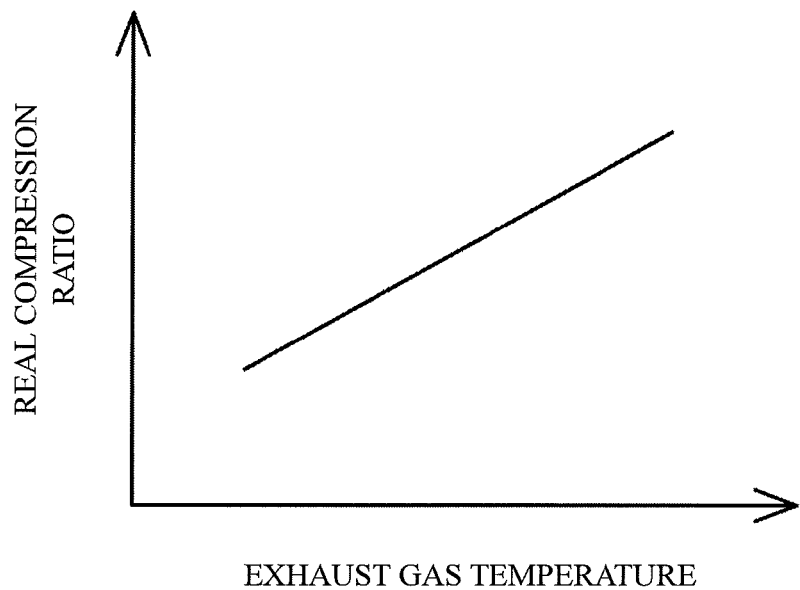
FIGS. 14(a) and 14(b) illustrate exemplary maps for calculating the real compression ratio, wherein (a) is an exemplary relationship between the exhaust temperature and the real compression ratio, and (b) is an exemplary relationship between the air/fuel ratio and the real compression ratio.
Figure 14B:
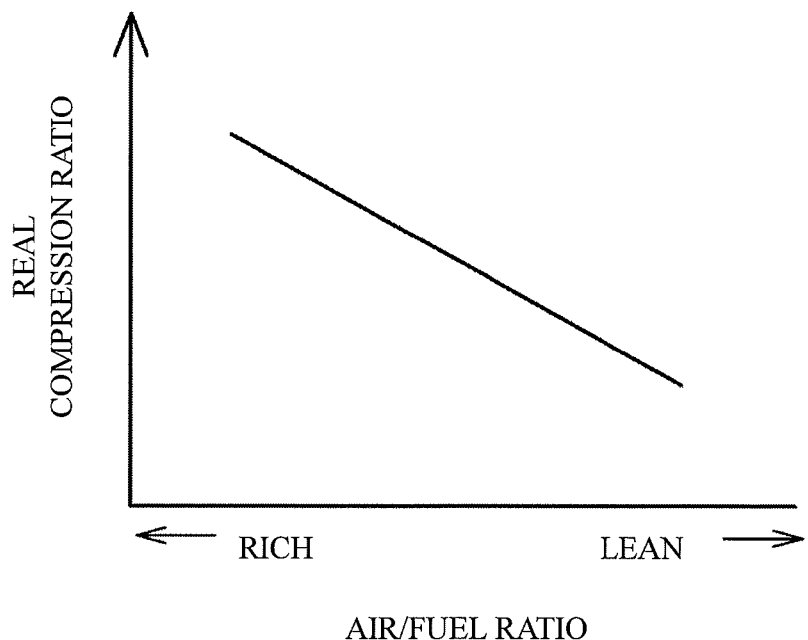

Then, the ECU 4 estimates the real compression ratio from the air/fuel ratio and the exhaust gas temperature (step S14). A concrete operation is as follows. The ECU 4 acquires the exhaust gas temperature from the exhaust temperature sensor 7, and acquires the air/fuel ratio from the A/F sensor 8. In calculation of the real compression ratio, the ECU 4 looks up a model or map that is prepared for calculating the real compression ratio on the basis of the air/fuel ratio and the exhaust gas temperature. Here, an example of expressing the map two-dimensionally is illustrated in FIGS. 14(a) and 14(b). FIG. 14(a) illustrates an exemplary relationship between the exhaust gas temperature and the real compression ratio, and FIG. 14(b) illustrates an exemplary relationship between the air/fuel ratio and the real compression ratio.

Since increase in the exhaust gas temperature is considered to be equivalent to increase in the fuel injection amount, the possibility of misfiring rises as the exhaust gas temperature rises. Since the real compression ratio is increased in order to avoid misfiring, as illustrated in FIG. 14(a), a map is formed so that the real compression ratio increases as the exhaust gas temperature rises. Since the air ratio increases as the air/fuel ratio increases, as illustrated in FIG. 14(b), the map is formed so that the real compression ratio decreases conversely as the air/fuel ratio increases. The real compression ratio is calculated by combining the relationships illustrated in FIGS. 14(a) and 14(b). The maps for calculating the real compression ratio may be a three-dimensional or not less than three-dimensional maps, which may further include factors other than the exhaust gas temperature and the air/fuel ratio such as the engine speed, the load and the intake air temperature of the internal combustion engine.

Then, the ECU 4 determines whether the real compression ratio has a change before and after the variable valve driving mechanism 10 operates (step S15). That is, it is determined whether the real compression ratio estimated in step S14 has changed to the target value. If an affirmative determination is made in step S15, the ECU 4 increases the fuel injection amount (step S16). Here, the fuel injection amount is increased to adjust the equivalence ratio suitable for regeneration of the reduction catalyst 9, and rich combustion is thus performed. The ECU 4 returns to step S13, if the ECU 4 makes a negative determination in step S15. After finishing the process in step S16, the ECU 4 returns.

If the ECU 4 makes a negative determination in step S12, the ECU 4 continues normal combustion in step S17. After fining the process in step S17, the ECU 4 returns.

Figure 15:
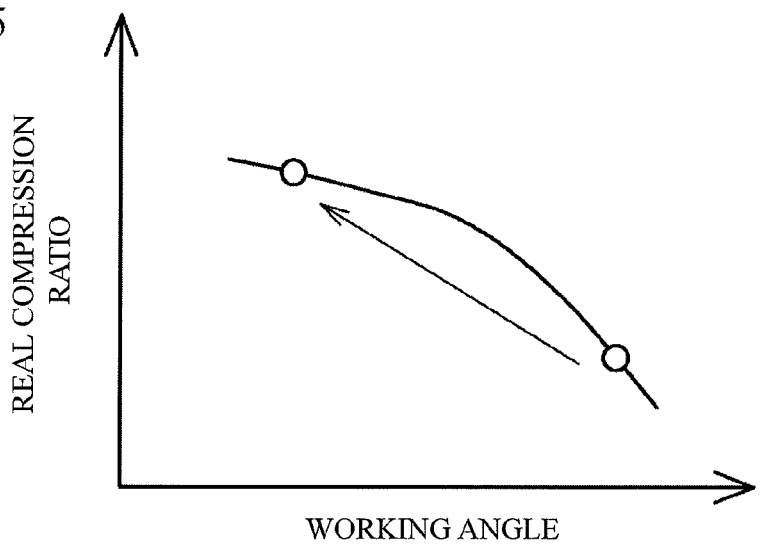
FIG. 15 is a diagram of the real compression ratio that changes by a process of step S13.
Figure 16:
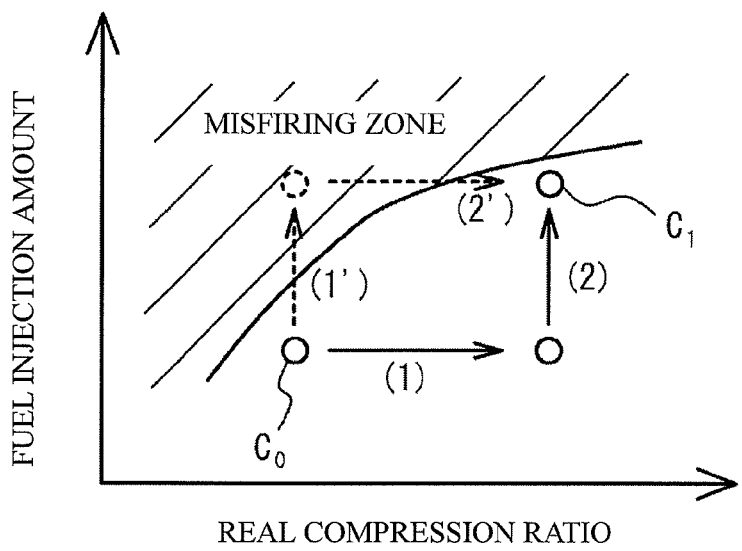
FIG. 16 is a diagram of a relationship between the fuel injection amount and the real compression ratio with the amount of air being constant and the misfiring region.
Figure 17:
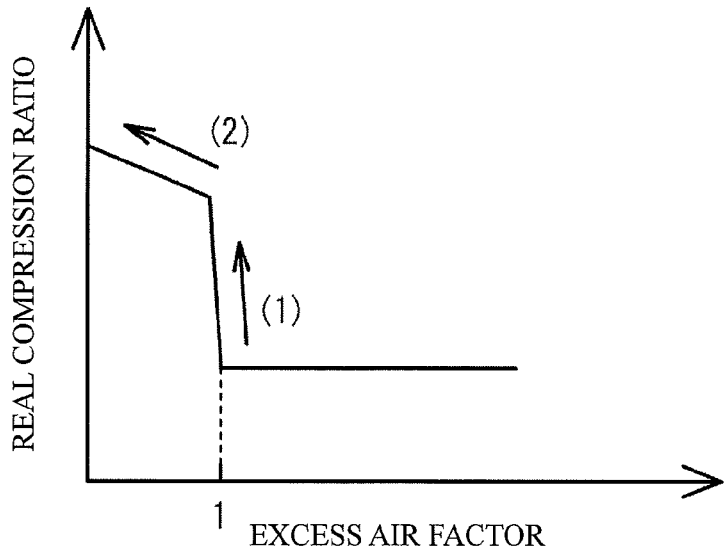
FIG. 17 is a diagram of a relationship between the real compression ratio and the excess air factor observed when changes are made along arrows (1) and (2) in FIG. 16.

FIG. 15 is a diagram of the real compression ratio that changes by the process of step S13. FIG. 16 is a diagram of a relationship between the fuel injection amount and the real compression ratio with the amount of air being constant, and the misfiring zone. In FIG. 16, it is assumed that the condition is changed from a condition $C_0$ before the control to a target condition $C_1$ when rich combustion is required. FIG. 17 is a diagram of a relationship between the real compression ratio and the excess air factor $\lambda$, observed when changes are made along arrows (1) and (2) in FIG. 16. The excess air factor $\lambda$, is a reciprocal of the equivalence ratio $\phi$.

Now, in normal combustion, misfiring occurs with a small amount of fuel injected. In rich combustion, misfiring is induced when fuel is injected under conditions that the in-cylinder temperature is low because the temperature in the cylinders 5 decreases due to the heat absorbing function in vaporization of fuel. Thus, under rich-combustion conditions, it is required to increase the in-cylinder temperature before the fuel injection amount is increased. According to the above control, as illustrated in FIG. 15, the real compression ratio rises due to the reduction in the working angle performed in step S13. Further, as illustrated in FIG. 16, (1) after the real compression ratio is raised by the operation of the variable valve driving device in step S13, (2) the fuel injection amount is increased in step S16, whereby rich combustion is performed without misfiring. In contrast to the above sequence, if (1') after the fuel injection amount is increased in step S16, (2') the real compression ratio is raised by the operation of the variable valve driving device in step S13, the conditions enter into the misfiring zone when the fuel injection amount is increased in (1'). Therefore, the above control performs step S16 after step S13 without exception in order to avoid the misfiring.

A description is now given of a relationship between the load on the internal combustion engine 1 and the equivalence ratio $\phi$ changed in the above control. Since the internal combustion engine 1 operates while changing the air/fuel ratio in accordance with the load thereon, different loads correspond to different equivalence ratios. For example, in normal combustion, the equivalence ratio $\phi$ is approximately 0.3 at low loads and the engine is under lean conditions having excessive air. In contrast, at high loads, the ratio of fuel increases and the equivalence ratio $\phi$ is approximately 0.7, for example. However, when it is requested to regenerate the NOx reduction catalyst 9, switching directed to making the equivalence ratio $\phi$ equal to or larger than 1 is required irrespective of whether the load is high or low. That is, it is required to change the equivalence ratio $\phi$ from 0.3 to 1 or more under low load conditions and to change the equivalence ratio $\phi$ from 0.7 to 1 or more under high load conditions. Thus, the amount of intake air into the cylinders under low load conditions and that under high load conditions are different from each other.

Therefore, it is required to change the timing of the closing of the intake valves 19 in accordance with the load.

Figure 18:
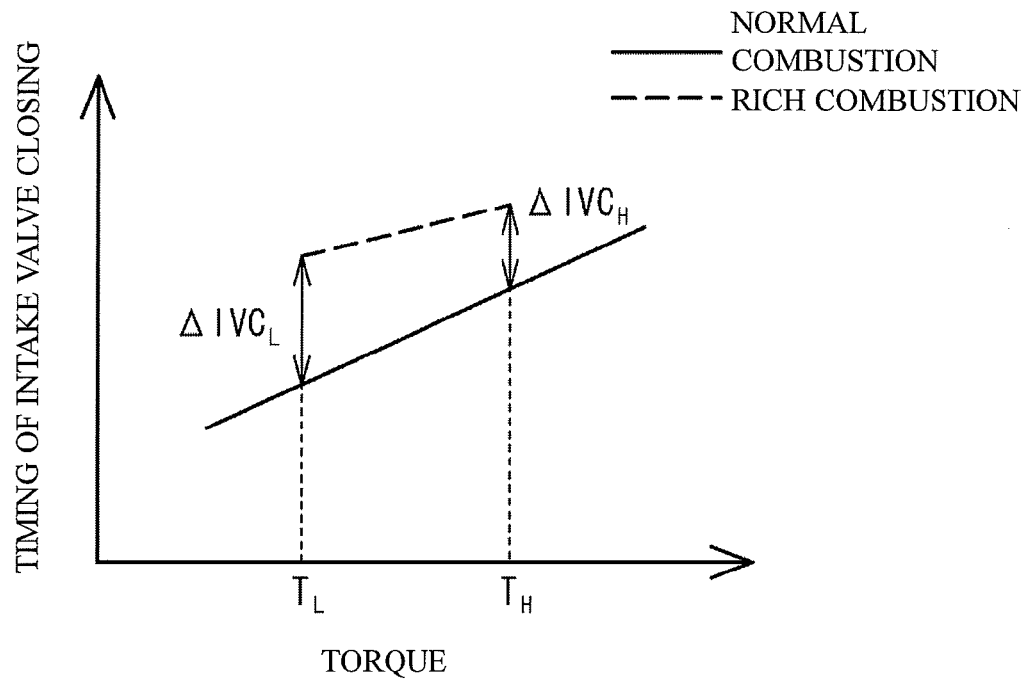
FIG. 18 is a diagram between a relationship between torque of the internal combustion engine and the timing of the closing of the intake valves.

FIG. 18 is a diagram of a relationship between the torque (load) of the internal combustion engine 1 and the timing of the closing of the intake valves 19 (IVC). A solid line in FIG. 18 indicates normal combustion, and a broken line indicates rich combustion. As illustrated in FIG. 18, by the control of the ECU 4, as the internal combustion engine 1 has a smaller load, the advance amount of IVC has a larger value. That is, it is seen from a comparison between an advance amount $\Delta IVC_L$ at a low load $T_L$ and an advance amount $\Delta IVC_H$ at a high load $T_H$ that the advance amount $\Delta IVC_L$ at low load $T_L$ is larger than the advance amount $\Delta IVC_H$ at high load $T_H$. This is because the amount of intake air reduced at low loads is larger than that at high loads, as described above. Since the intake air amount reduces as the advance amount of IVC increases, the advance amount of IVC at low loads is larger than that at high loads. As described above, the control device 100 changes the amount of advance of the timing of the intake valve closing in accordance with the load on the internal combustion engine 1, so that switching control that suitably depends on the magnitude of the load on the internal combustion engine 1 is feasible. The control device 100 realizes the control suitable for operating conditions of the internal combustion engine 1.

Comparison Between Embodiment and Comparative Example

Figure 19:
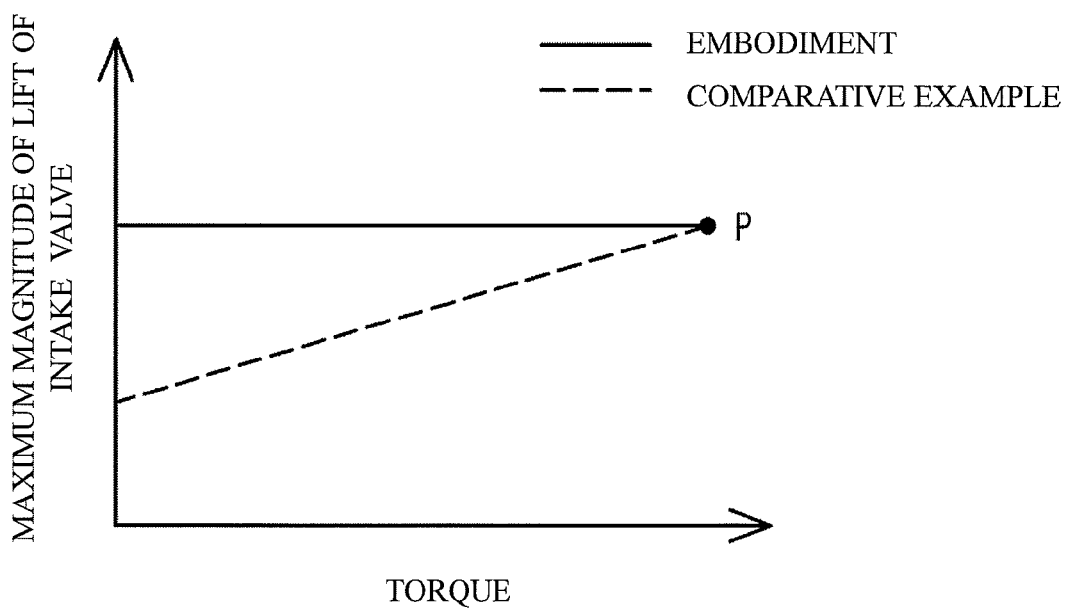
FIG. 19 is a diagram of a relationship between the maximum magnitude of lift of the intake valves and torque in the embodiment and the comparative example.

A description is now given of effects of the embodiment in comparison with the comparative example. First, a relationship in valve lift between the embodiment and the comparative example is described. FIG. 19 illustrates a relationship between the maximum magnitude of lift of the intake valves and torque in the embodiment and the comparative example. A solid line in FIG. 19 indicates the embodiment, and a broken line indicates the comparative example. In the comparative example, when the working angle is changed, the maximum magnitude of lift changes. However, the magnitude of lift of the intake valves changes in accordance with torque because the working angle is changed in accordance with torque. In contrast, according to the embodiment, the maximum magnitude of lift is constant irrespective of the working angle. As illustrated in FIG. 19, in the relationship in valve lift between the embodiment and the comparative example, the maximum magnitude of lift in the comparative example corresponds to the maximum magnitude of lift in the embodiment at the output point P.

Figure 20:
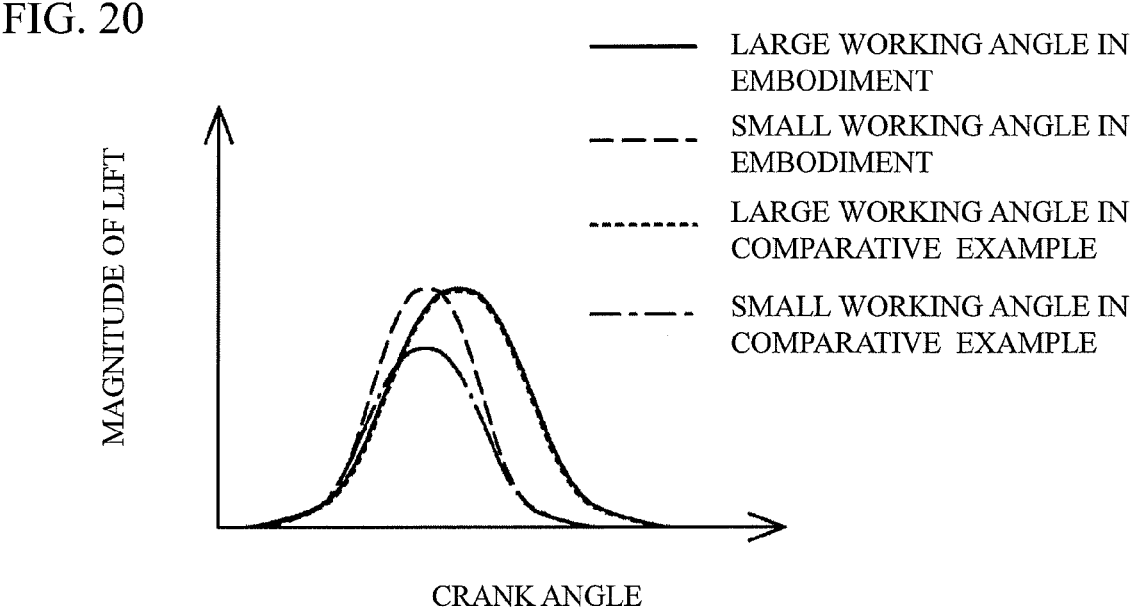
FIG. 20 is a diagram of a comparison between the lift curve of the embodiment and the lift curve of the comparative example.
Figure 21:
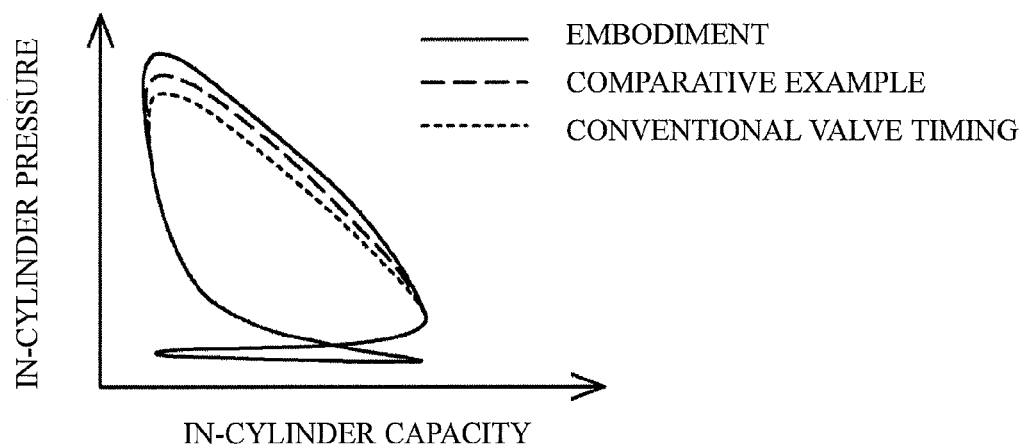
FIG. 21 is a diagram of a relationship between an in-cylinder pressure and an in-cylinder capacity during one cycle.
Figure 22:
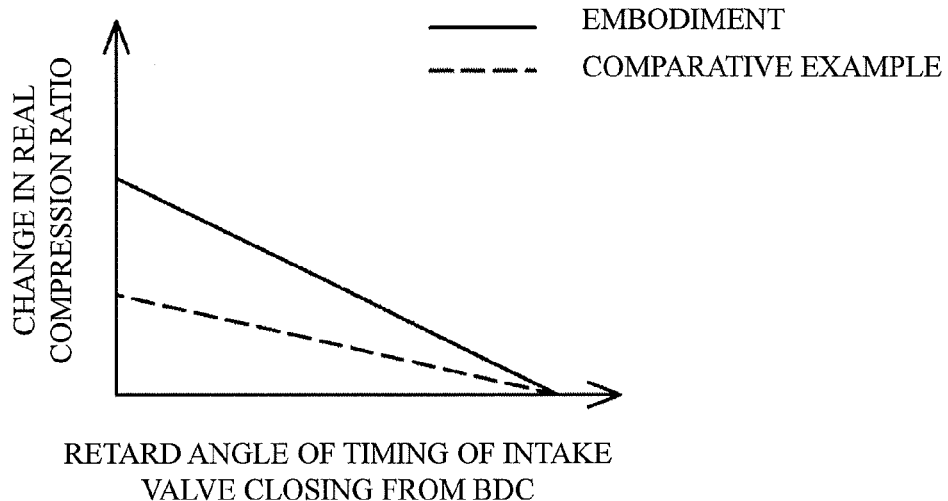
FIG. 22 is a diagram of a relationship between the real compression ratio and the angle of the timing of closing the intake valve from BDC.

FIG. 20 is a diagram of a comparison between the lift curve of the embodiment and the lift curve of the comparative example. A solid line in FIG. 20 indicates a lift curve observed when the working angle in the embodiment is increased, and a broken line indicates a lift curve observed when the working angle in the embodiment is decreased. A dotted line indicates a lift curve in the comparative example observed when the working angle corresponds to the lift curve of the solid line, and a one-dot chained line indicates a lift curve in the comparative example observed when the working angle corresponds to the lift curve of the broken line. FIG. 21 is a diagram of a relationship between the in-cylinder pressure and the in-cylinder capacity during one revolution. FIG. 21 illustrates an example when the working angle is decreased, and a solid line indicates the embodiment with the working angle being decreased. A broken line indicates the comparative example with the working angle being decreased, and a dotted line indicates an example having the conventional valve timing of an internal combustion engine that is not provided with any of the variable valve driving mechanisms 10 and 50. FIG. 22 is a diagram of a relationship between the real compression ratio and the angle of the timing of the intake valve closing (IVC) from BDC. In FIG. 22, a solid line indicates an example of the embodiment, and a broken line indicates an example of the comparative example.

As illustrated in FIG. 20, when the working angle in the comparative example is decreased, the magnitude of lift of the intake valve decreases. Thus, the intake air amount decreases and the pumping loss increases. Further, due to the decrease in the intake air amount, as illustrated in FIG. 21, the maximum in-cylinder pressure $P_M$ decreases. In the comparative example, since the intake air amount decreases drastically when the working angle of the intake valve is decreased, the above control has larger error and a difficulty in controlling. In contrast, as illustrated in FIG. 20, according to the embodiment, the maximum magnitude of lift does not change even when the working angle is decreased. Thus, the intake air amount does not have a large decrease and increase in pumping loss is suppressed. Further, since the intake air amount does not decrease greatly, as illustrated in FIG. 21, the maximum in-cylinder pressure $P_{MAX}$ can be kept high. Further, as illustrated in FIG. 22, the real compression ratio becomes higher as IVC becomes closer to BDC, and the amount of change in the embodiment is larger than that in the comparative example.

Figure 23:
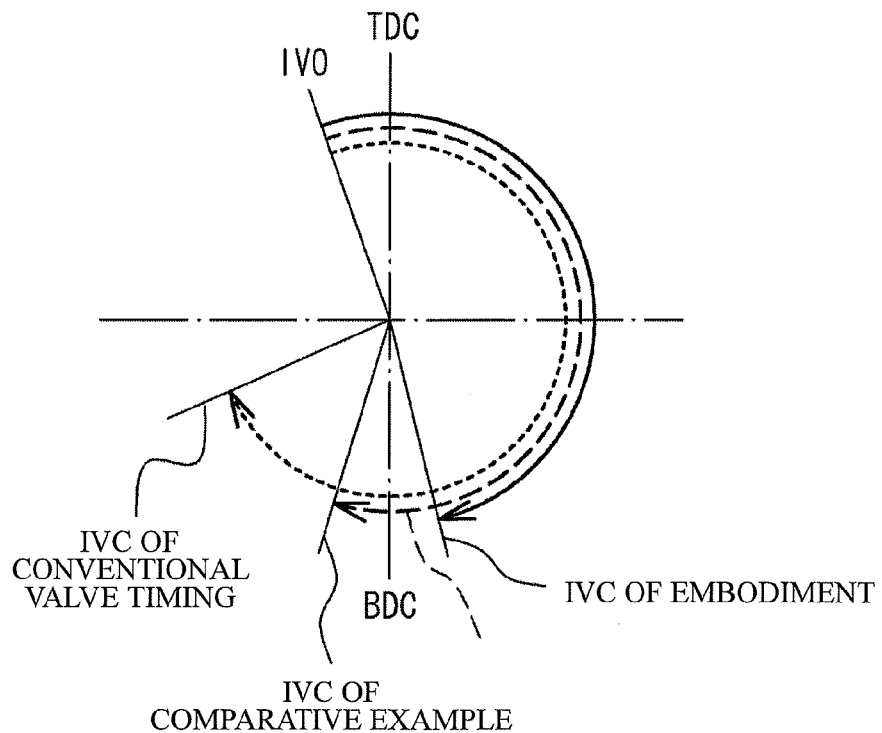
FIG. 23 is a diagram of a valve timing of the intake valves.
Figure 24:
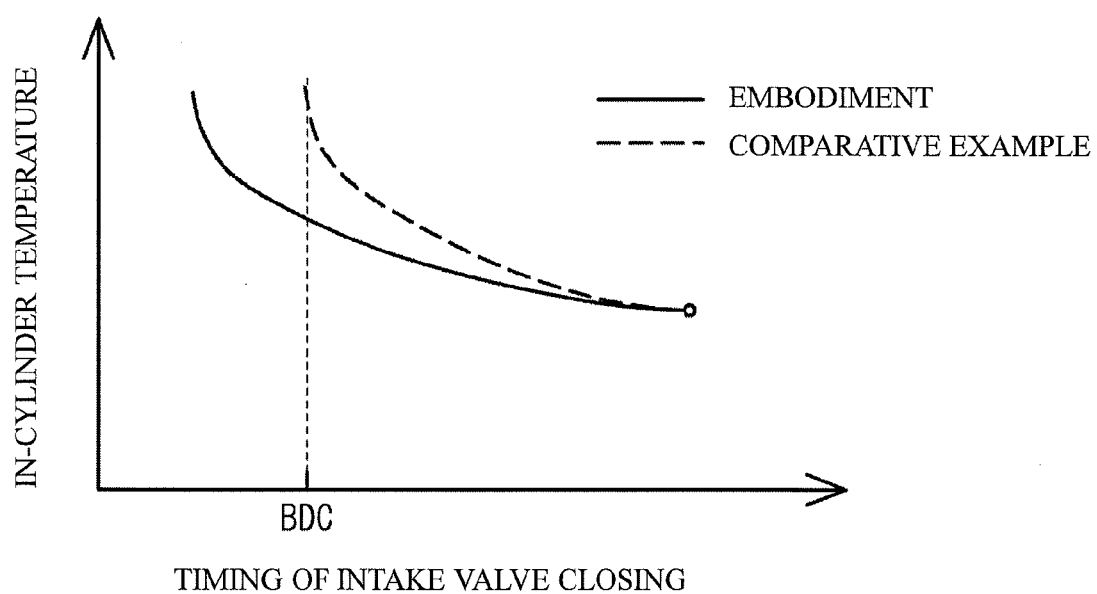
FIG. 24 is a diagram of a relationship between the in-cylinder temperature and the timing of the closing of the intake valves.

FIG. 23 is a diagram of valve timings of the intake valves. In FIG. 23, a solid line indicates the embodiment, and a broken line indicates the comparative example, a dotted line indicating a conventional valve timing of the internal combustion engine that is not provided with any of the variable valve driving mechanisms 10 and 50. FIG. 24 is a diagram of a relationship between the in-cylinder temperature and the timing of the intake valve closing. A solid line in FIG. 24 indicates an example of the embodiment, and a broken line indicates an example of the comparative example.

As illustrated in FIG. 23, the timings of the intake valve opening (IVO) illustrated are the same as each other. Since the amount of intake air is reduced in rich combustion, it is better to have a large real compression ratio. Thus, it is desirable that the intake valves are closed in the vicinity of BDC having a large real compression ratio. IVC in the embodiment is slightly earlier than BDC, and IVC in the comparative example is slightly later than BDC. In the valve timing without the variable valve driving mechanism, IVC is considerably later than BDC. As illustrated in FIG. 24, the real compression ratio is increased by advancing IVC in the comparative example as well as the embodiment, and therefore, the in-cylinder temperature rises. As has been illustrated in FIG. 9, the real compression ratio reaches the maximum at BDC, and principally decreases if IVC is earlier than BDC. However, if IVC is later than BDC, blow-back of intake air occurs, and the temperature of intake air in the cylinders decreases. In contrast, if IVC is earlier than BDC, the temperature of intake air in the cylinders is maintained. Thus, misfiring hardly occurs. Although even in the comparative example, the structure may make IVC earlier than BDC, the magnitude of lift decreases due to the decrease in the working angle, and the intake air amount decreases. This causes a problem of having a difficulty in control such that misfiring is likely to occur and a problem of having large pumping loss. In contrast, as in the case of the embodiment, the structure in which the maximum magnitude of lift does not decrease when the working angle is decreased and does not result in a large decrease in the intake air amount, and makes it possible to set IVC earlier than BDC. As described above, the embodiment is capable of making IVC earlier than BDC, and is thus capable of changing the real compression ratio and the intake air amount simultaneously.

A control to suppress misfiring in normal combustion may change the real compression ratio to suppress misfiring by changing the phases of the duration of the intake valve opening. However, it is required to decrease the intake air amount in rich combustion, and only the changing of the phases of the duration of the intake valve opening is not capable of meeting the requirement in rich combustion. In this case, the intake air amount is reduced by restricting the opening of the throttle valve, whereas pumping loss increases. In the embodiment, the intake air amount is also adjustable, whereby there is no need to consider increase in pumping loss that is a matter of concern.

(Feasible Region of Operation During Rich Combustion)

A description is given of a feasible region of operation during rich combustion in comparison with the comparative example. Criteria for determining the operation feasible region of the internal combustion engine during rich combustion may be the temperature when misfiring occurs, the equivalence ratio, the amount of HC emissions, the amount of smoke and the volume of sound. For example, if the temperature TCOMP at the compression end in the cylinder is too low, misfiring occurs, and HC emissions increase. In the operating zone at low loads, a target criterion is applied on the amount of HC emissions as a threshold for the feasible region of operation in rich combustion in order to prevent misfiring in the internal combustion engine 1. Since HC emissions are closely related to the compression end temperature TCOMP in the cylinders 5, the target criterion may be the compression end temperature TCOMP in the cylinders 5.

FIG. 25 is a diagram of the compression end temperature and HC emissions at low loads in the embodiment and the comparative example. Part (a) of FIG. 25 is a diagram of a relationship between the torque of the internal combustion engine 1 and the compression end temperature. Part (b) of FIG. 25 is a diagram of a relationship between torque and HC emissions. In the parts (a) and (b) of FIG. 25, solid lines indicate the embodiment, and broken lines indicate the comparative example. A point E in FIG. 25(a) corresponds to torque T1 with which the amount of HC emissions is at the target criterion CRH in the embodiment in FIG. 25(b). A point F in FIG. 25(a) corresponds to torque T2 with which the amount of HC emissions is at the target criterion CRH in the comparative example in FIG. 25(b). A point G in FIG. 25(a) has the same torque conditions as those at the point F in the embodiment. FIG. 26 depicts lift curves respectively at the points E, F and G.

As illustrated in FIG. 25(b), in an operation with torque less than torque $T_1$ in the embodiment, the feasible region of operation is assumed to have not less than torque $T_1$ since the amount of HC emissions exceeds the target criterion $CR_H$. Similarly, as illustrated in FIG. 25(b), in an operation with torque less than torque $T_2$ in the comparative example, the feasible region of operation is assumed to have not less than torque $T_2$ since the amount of HC emissions exceeds the target criterion $CR_H$. As illustrated in FIG. 25, torque $T_1$ is smaller than torque $T_2$. As illustrated in FIG. 26, it is seen from comparison between the lift curve of the comparative example at the point F and that of the embodiment at the point G with torque $T_2$ that the lift curve at the point G has a larger magnitude of lift than the lift curve at the point F, which makes it possible to advance the timing of IVC. The embodiment capable of advancing IVC is feasible for setting the real compression ratio higher than the comparative example under the same torque condition. As a result, the in-cylinder temperature can be kept high, and the compression end temperature $T_{COMP}$ can be made high. This result is reflected on FIG. 25(a), and the compression end temperature $T_{COMP}$ in the embodiment is higher than that in the comparative example under the same torque condition in the zone of low loads (in which torque is equal to or less than $T_0$). As described above, since the embodiment is capable of increasing the compression end temperature $T_{COMP}$, operation with reduced torque is possible. Therefore, the feasible region of operation in the embodiment can be expanded up to $T_1$.

In the operation zone at high loads on the internal combustion engine, in order to suppress the generation of smoke emissions of the internal combustion engine 1, a target criterion is applied on the amount of smoke emissions as a threshold for the feasible region of operation in rich combustion. Since the amount of smoke emissions is closely related to the compression end temperature TCOMP in the cylinders 5, the target criterion may be the compression end temperature TCOMP in the cylinders 5.

FIG. 27 illustrates the compression end temperature and the amount of smoke emissions at high loads in the embodiment and the comparative example. Part (a) of FIG. 27 is a diagram of a relationship between torque and the compression end temperature of the internal combustion engine 1. Part (b) of FIG. 27 is a diagram of a relationship between torque and the amount of smoke emissions. In parts (a) and (b) of FIG. 27, solid lines indicate the embodiment, and broken lines indicate the comparative example. A point H in FIG. 27(a) corresponds to torque $T_4$ with which the amount of smoke emissions is at the target criterion $CR_S$ in the embodiment. A point J in FIG. 27(a) corresponds to torque $T_3$ with which the amount of smoke emission is at the target criterion $CR_S$ in the comparative example. A point K in FIG. 27(a) has the same torque conditions as those at the point J in the embodiment. FIG. 28 depicts lift curves respectively at the points H, J and K in FIG. 27(a).

As illustrated in FIG. 27(b), in an operation with torque over torque $T_4$ in the embodiment, the feasible region of operation is assumed to have not more than torque $T_4$ because the amount of smoke emissions exceeds the target criterion $CR_S$. Similarly, as illustrated in FIG. 27(b), in an operation torque over torque $T_3$ in the comparative example, the feasible region of operation is assumed to have not more than torque $T_3$ because the amount of smoke emission exceeds the target criterion $CR_S$. As illustrated in FIG. 27, torque $T_4$ is larger than torque $T_3$. As illustrated in FIG. 28, it is seen from comparison between the lift curve in the comparative example at the point J and the lift curve in the embodiment at the point K with torque $T_3$ that the lift curve at the point K has a larger magnitude of lift than that at the point J, which makes it possible to retard IVC. The embodiment capable of retarding IVC is capable of setting the real compression ratio lower than the comparative example under the same torque condition. As a result, the in-cylinder temperature can be reduced and the compression end temperature $T_{COMP}$ can be lowered. This result is reflected on FIG. 27(a), and the compression end temperature $T_{COMP}$ in the embodiment is lower than that in the comparative example under the same torque condition in the zone of high loads (in which torque is equal to or larger than $T_0$). As described above, since the embodiment is capable of decreasing the compression end temperature $T_{COMP}$, operation with increased torque is possible. Therefore, the feasible region of operation in the embodiment can be expanded up to $T_4$. In the comparative example, since the magnitude of lift increases more as IVC retards more, the intake air amount increases, the conditions for rich combustion are not maintained. In the embodiment, since the maximum magnitude of lift is kept constant even if IVC is retarded, the amount of increase of the intake air is small and the conditions for rich combustion can be maintained.

Figure 29A:
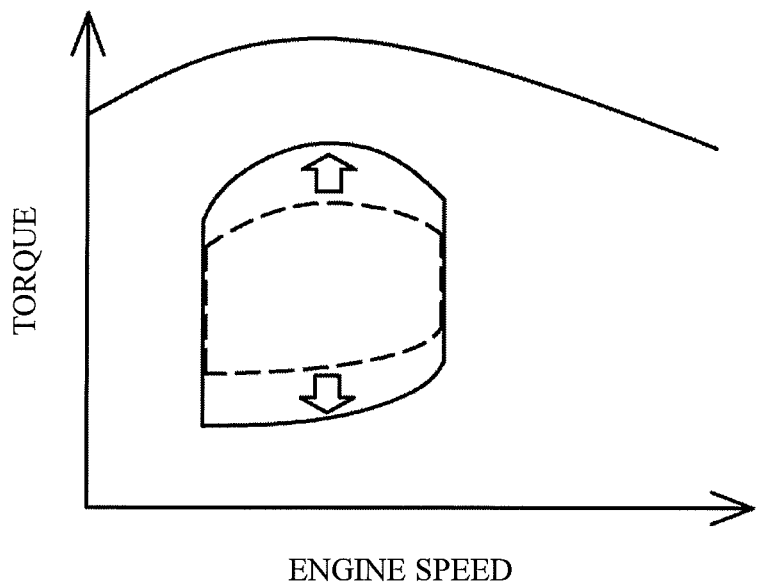
Figure 29B:
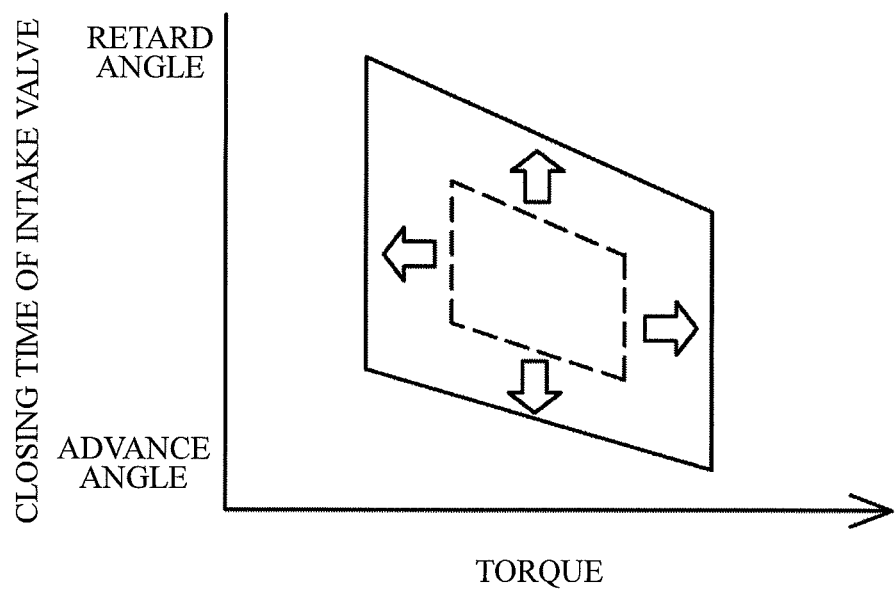

An expansion of the feasible region of operation in the embodiment is depicted in FIGS. 29(a) and 29(b). FIGS. 29(a) and 29(b) are diagrams of a comparison between the embodiment and the comparative example during rich combustion. FIG. 29(a) is a diagram that illustrates the feasible region of operation by using the torque and the engine speed. FIG. 29(b) is a diagram that illustrates the feasible region of operation by using the timing of the closing of the intake valves and torque. In FIGS. 29(a) and 29(b), solid lines indicate the embodiment, and broken lines indicate the comparative example. As illustrated in FIGS. 29(a) and 29(b), the embodiment is capable of expanding the upper and lower ends of torque, compared to the comparative example. Further, IVC can be expanded on the retard and advance sides. Since the embodiment is capable of increasing the real compression ratio by expanding IVC on the advance side, the combustion temperature can be improved. Further, in the embodiment, by expanding IVC on the retard side, pumping loss of the internal combustion engine is reduced and fuel economy is improved. As described above, in the embodiment, the feasible region of operation is expanded during rich combustion, compared to the comparative example.

Embodiment 2

Control to Calculate Real Compression Ratio from in-Cylinder Pressure

Figure 30:
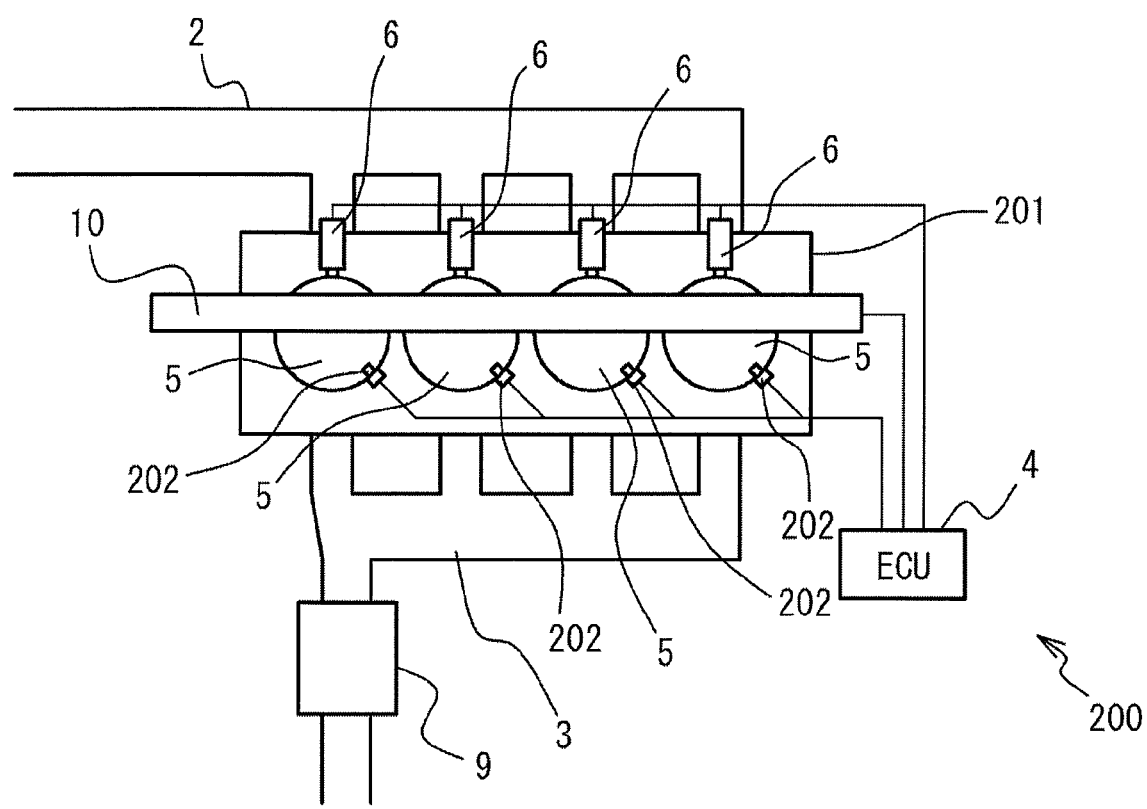
FIG. 30 is a diagram of a control device for an internal combustion engine described in Embodiment 2.

A description is now given of Embodiment 2. FIG. 30 is a diagram of a control device 200 of an internal combustion engine 201 in accordance with Embodiment 2. The internal combustion engine 201 has a structure that is almost the same as that of the internal combustion engine 1 of Embodiment 1. Compared to the internal combustion engine 1 of Embodiment 1, the internal combustion engine 201 is not provided with the exhaust temperature sensor and the A/F sensor in the exhaust system 3. Instead, the internal combustion engine 201 is provided with an in-cylinder pressure sensor 202 for each of the cylinders 5. The in-cylinder pressure sensors 202 detect pressures in the cylinders 5. The in-cylinder pressure sensors 202 and the ECU 4 are electrically interconnected, and the in-cylinder pressures detected by the in-cylinder pressure sensors 202 are input into the ECU 4. Since the other structures are similar to those of the internal combustion engine 1 of Embodiment 1, a description thereof is omitted and the similar numerals are given in FIG. 30.

Figure 31:
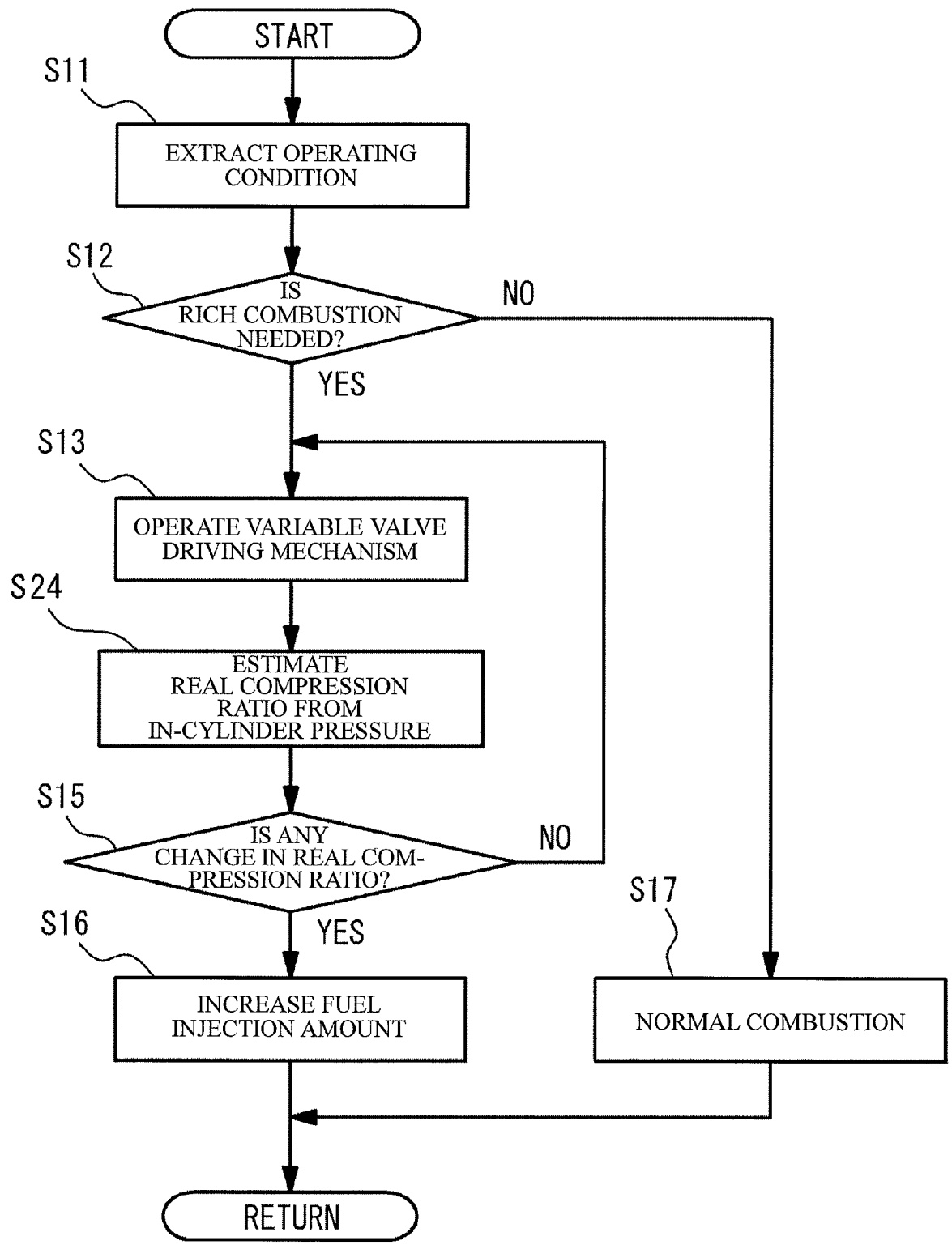
FIG. 31 is a flowchart of a control executed at the time of switching to rich combustion from normal combustion in Embodiment 2.

In Embodiment 2, as in the case of Embodiment 1, when the amount of NOx absorbed in the reduction catalyst 9 reaches the saturated state, the NOx absorption capability is regenerated by rich combustion. FIG. 31 is a flowchart of a control that is performed at the time of switching from normal combustion to rich combustion in Embodiment 2. This control is executed by the ECU 4. The flowchart of FIG. 31 is the same as that of FIG. 13 except that step S24 is carried out instead of step S14. A description of the same process as that in FIG. 13 is omitted here.

In the control of Embodiment 2, the ECU 4 estimates the real compression ratio from the in-cylinder pressure after finishing the process of step S13 (step S24). A concrete operation is as follows. The ECU 4 acquires the in-cylinder pressure from the in-cylinder pressure sensor 202 before and after compression in each cylinder 5, and calculates the real compression ratio on the basis of the in-cylinder pressure. The real compression ratio is calculated by dividing the in-cylinder pressure $P_A$ before compression by the in-cylinder pressure $P_B$. The ECU 4 proceeds to the process of step S15 after finishing the process of step S24.

As described above, the real compression ratio may be calculated from the in-cylinder pressure, and the control of the switching to rich combustion may be performed. As in the case of Embodiment 2, the real compression ratio can be calculated more accurately by calculating the real compression ratio from the in-cylinder pressure. It is thus possible to keep the insides of the cylinders under rich conditions until just before the limit over which misfiring occurs. Even if misfiring occurs, its detection is easy and rapid recovery is feasible.

Embodiment 3

Avoidance of Misfiring Relating to Flow Rate of Intake Air

A description is now given of Embodiment 3. A control device for an internal combustion engine of Embodiment 3 has a similar structure to that of the control device 100 of Embodiment 1. Hereinafter, similar reference numerals are given to similar structures, and a detailed description of similar structures is omitted. The control device 100 of Embodiment 3 is a control device having a further restricted valve timing of the intake valves 19 during rich combustion.

Figure 32A:
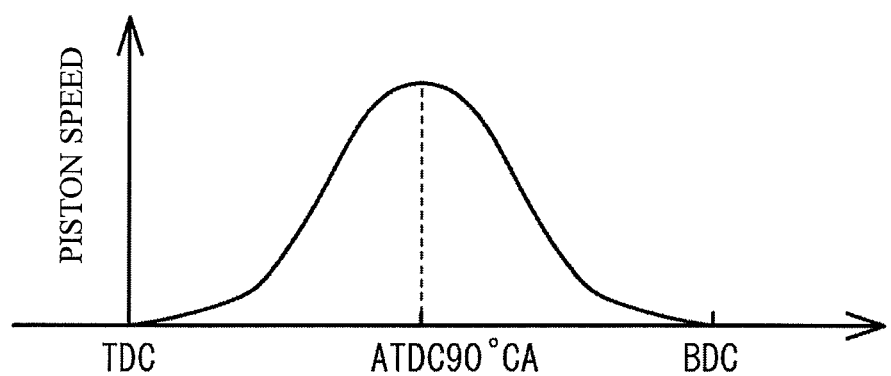
FIGS. 32(a) through 32(c) are diagrams of open timings of the intake valves in Embodiment 3, wherein FIG. 32(a) indicates the piston speed, FIG. 32(b) indicates the magnitude of lift, and FIG. 32(c) indicates the flow rate of intake air passing through an intake port.
Figure 32B:
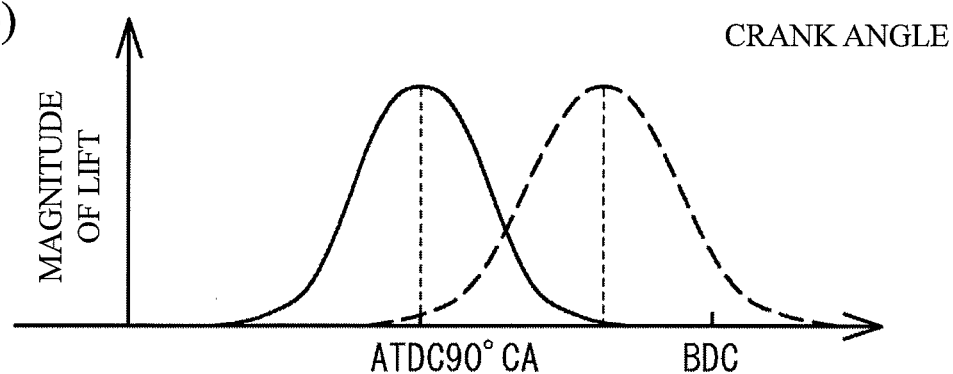
Figure 32C:
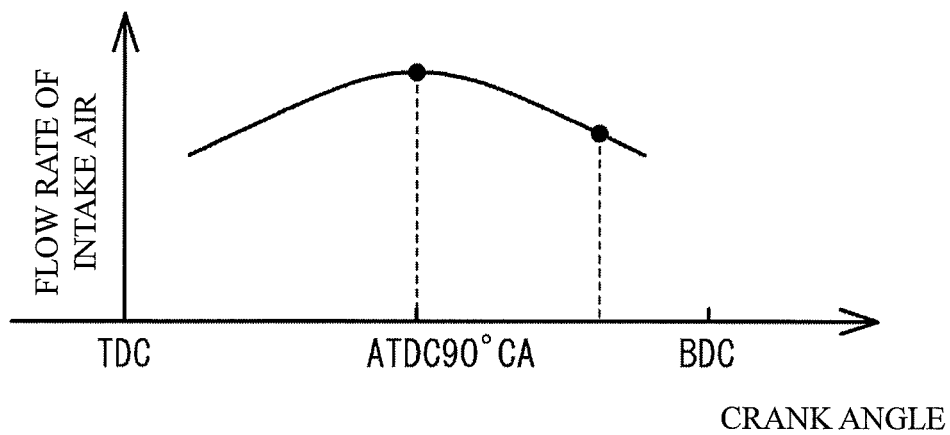
Figure 33:
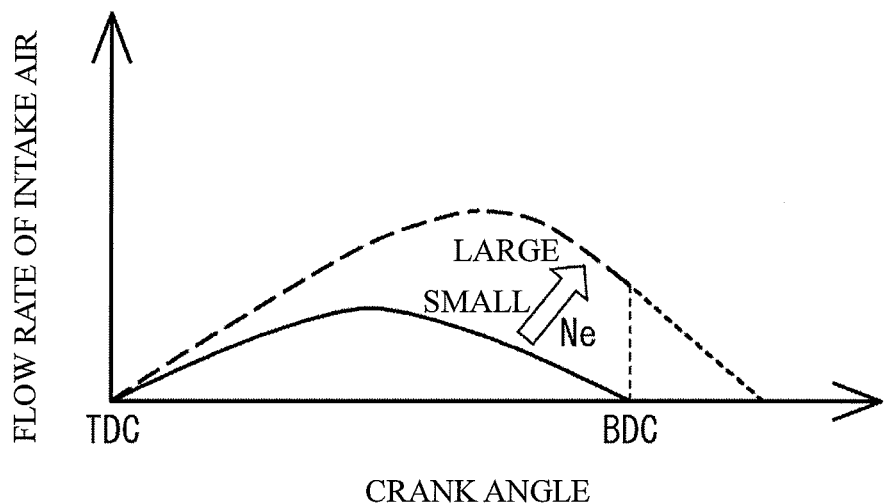
FIG. 33 is a diagram of a change of the flow rate of intake air in response to an increased speed of the internal combustion engine in Embodiment 3.
Figure 34:
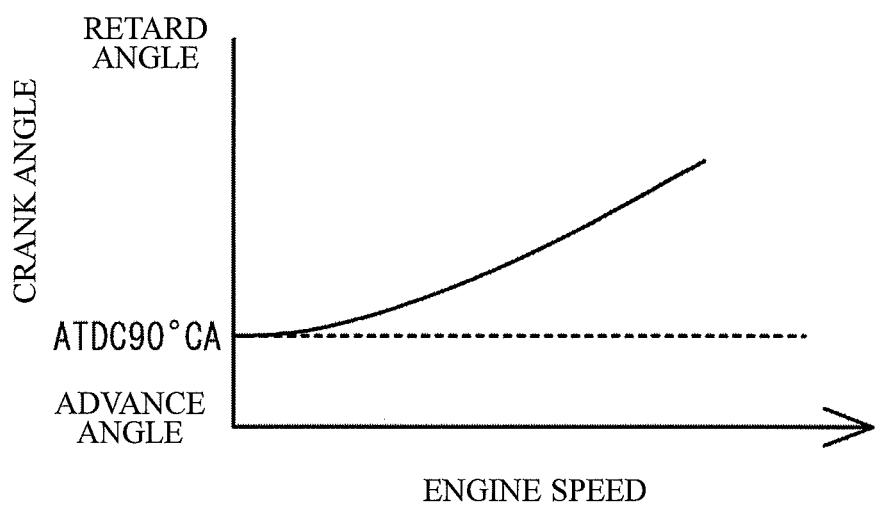
FIG. 34 is a diagram of a map for calculating, from the speed of the internal combustion engine, a crank angle at which the magnitude of lift of the intake valves becomes the maximum.

FIGS. 32(a) through 32(c) are diagrams of the timing of the opening of the intake valves 19. The horizontal axes of FIGS. 32(a) through 32(c) denote the crank angle. FIG. 32(a) is a diagram that indicates the piston speed, FIG. 32(b) is a diagram that indicates the magnitude of lift of the intake valves 19, and FIG. 32(c) is a diagram that indicates the flow rate of intake air that passes through the intake port of the internal combustion engine 1. A solid line in FIG. 32(b) indicates a lift curve observed when the maximum magnitude of lift is located at an angle that is retarded by 90° from the top-dead-center (ATDC 90° crank angle), and a broken line indicates a lift curve having the same intake air amount as that of the lift curve of the solid line in a position that is closer to BDC than the ATDC 90° crank angle. In this lift curve of the broken line, the working angle is larger than that of the lift curve of the solid line and the pumping loss is less. FIG. 33 is a diagram that shows a change of the flow rate of the intake air as the speed of the internal combustion engine 1 increases. The horizontal axis of FIG. 33 denotes the crank angle. The vertical axis of FIG. 33 denotes the flow rate of the intake air that passes through the intake port of the internal combustion engine 1. A solid line in FIG. 33 indicates the flow rate of the intake air at low revolutions, and a broken line indicates the flow rate of the intake air at high revolutions. FIG. 34 indicates a map used to calculate, from the engine speed of the internal combustion engine 1, a crank angle at which the maximum magnitude of lift of the intake valves 19 is available.

The embodiment has an advantage over the comparative example in terms of suppression of pumping loss. However, in the embodiment, the combustion temperature is likely to decrease due to small pumping loss during rich combustion. Misfiring is likely to occur due to decrease in the combustion temperature. In Embodiment 3, in order to avoid further misfiring, the control device opens the intake valves at a timing when pumping loss becomes the maximum. Now, a detailed description is given with reference to FIGS. 32 through 34.

As illustrated in FIG. 32(a), the speed of the pistons of the internal combustion engine 1 becomes the fastest at an angle that retards by 90° from the top-dead-point (ATDC90° CA).

At this time, under the operating conditions having a sufficiently small number of revolutions, pressure loss becomes the maximum under conditions having the fastest piston speed. As illustrated in FIG. 32(c), ATDC90° CA is also a condition that the flow rate of the intake air from the intake port becomes the maximum. In Embodiment 3, the valve timings of the intake valves 19 are changed so that the maximum magnitude of lift of the intake valves 19 (ATDC90° CA) has the peak (the maximum) at a timing when pressure loss becomes the maximum.

Actually, when the valve timing of the intake valves 19 is changed, if the amount of air is reduced quickly, the air/fuel ratio becomes rich rapidly, and misfiring occurs. Thus, in order to suppress this misfiring, when the in-cylinder temperature is changed during real rich combustion operation, the valve timings of the intake valves 19 are controlled while the amount of air is kept as constant as possible. As an exemplary change of the valve timing to rich combustion, the lift curve of the dotted line illustrated in FIG. 32(b) is changed to the lift curve of the solid line. In this example, the variable valve driving mechanism 10 reduces the working angle, and the phase of the valve opening is advanced by the VVT mechanism 16.

As the engine speed of the internal combustion engine 1 is higher, the inertial effects in the intake cylinders become greater, and as illustrated in FIG. 33, the peak position of the speed of air taken into the cylinders 5 is retarded. With the above in mind, under the actual operating conditions, it is controlled to retard the phase of the maximum magnitude of lift of the intake valves 19 in accordance with the map illustrated in FIG. 34. By this, at the timing having the maximum flow rate of intake air, the magnitude of lift of the intake valves becomes the maximum. As a result, pumping loss becomes the maximum, and decrease in the in-cylinder temperature is suppressed. It is thus possible to prevent misfiring. The structure of the control device for the internal combustion engine in Embodiment 3 may be similar to that of the control device 200 of Embodiment 2.

Embodiment 4

Control in Valve Overlap

Figure 35:
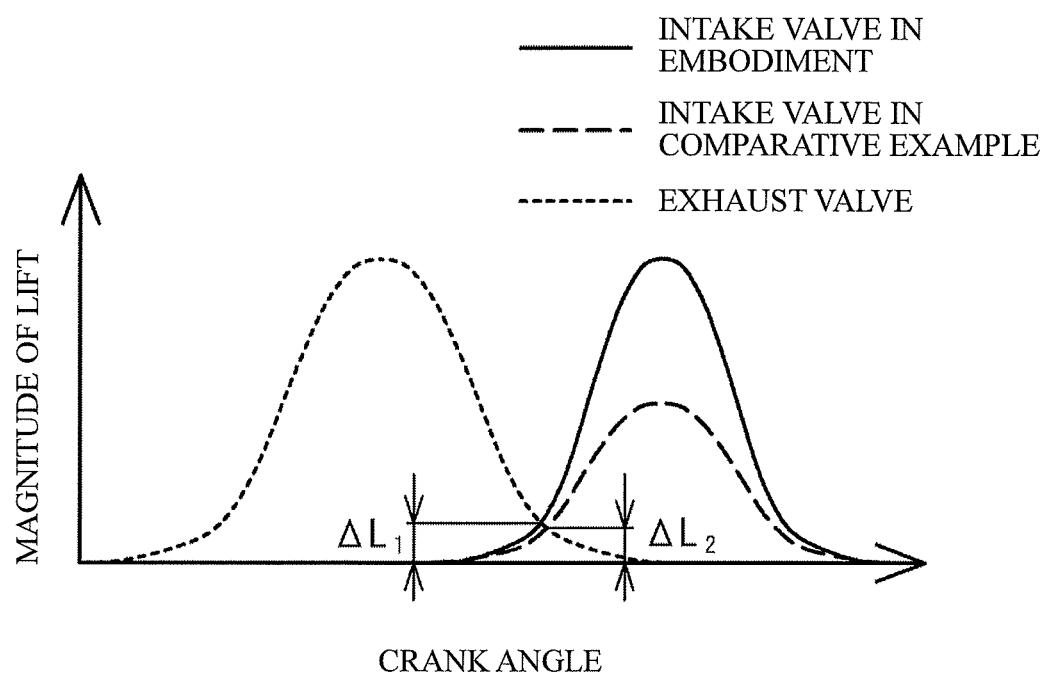
FIG. 35 is a diagram of a comparison in the magnitude of lift in overlapping between the embodiment and the comparative example under rich combustion conditions at low loads.

A description is now given of Embodiment 4. A control that takes valve overlap into consideration in Embodiment 4 is described. A control device for the internal combustion engine in Embodiment 4 has a structure similar to that of the control device 100 in Embodiment 1. Hereinafter, similar reference numerals are given to similar structures, and a detailed description of similar structures is omitted. In Embodiment 4, there is provided a variable valve operating mechanism (not illustrated) that changes the timing of exhaust valve closing (EVC) on the exhaust side. The variable valve driving mechanism on the exhaust side may be any of the aforementioned variable valve driving mechanisms 10 and 50 and the other embodiments. FIG. 35 is a diagram of a comparison in the magnitude of lift in overlap between the embodiment and a comparative example at low loads under conditions for rich combustion. A solid line in FIG. 35 indicates a lift curve of the intake valves 19 in the embodiment, a broken line indicates a lift curve of the intake valves 68, and a dotted line indicates a lift curve of exhaust valves. The exhaust valves in the embodiment and the comparative example are similar to each other. Due to the setting of the maximum magnitude of lift of the intake valves has a large magnitude of lift of the intake valves 19 at a reduced working angle, compared to the comparative example. As illustrated in FIG. 35, since the timing of the closing of the intake valves 19 is changed while the maximum magnitude of lift is kept constant, a magnitude of lift $\Delta_{L1}$ of the intake valves 19 during the overlap period is larger than a magnitude of lift $\Delta_{L2}$ of the comparative example under the conditions for rich combustion at low loads. As a result, blow-back of intake air into the intake port increases, and the internal EGR increases, whereby the in-cylinder temperature increases. At high loads, the amount of smoke emissions may exceed a tolerable value.

Figure 36A:
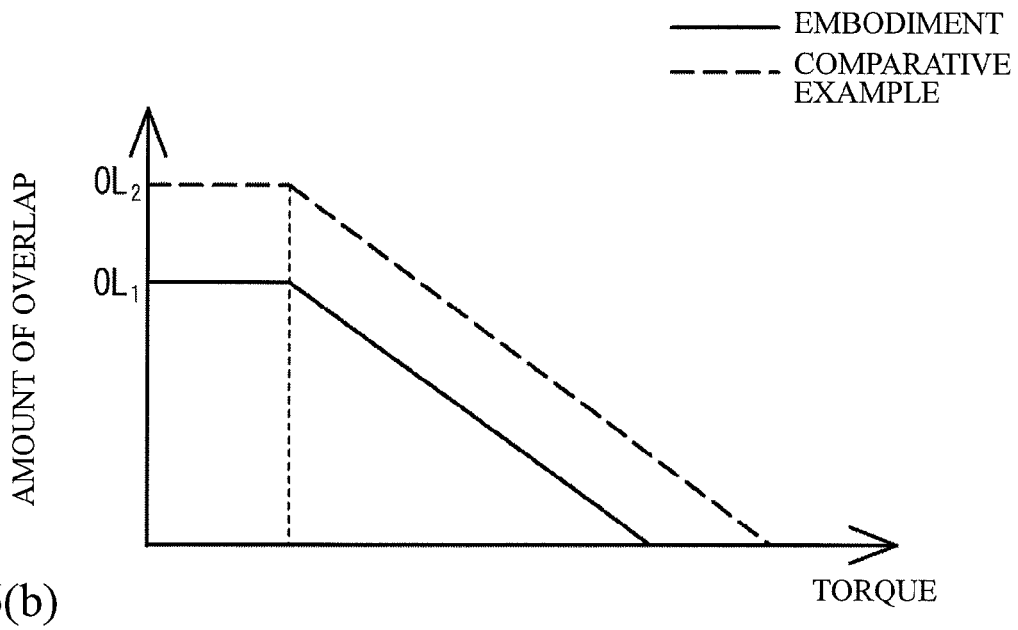
Figure 36B:
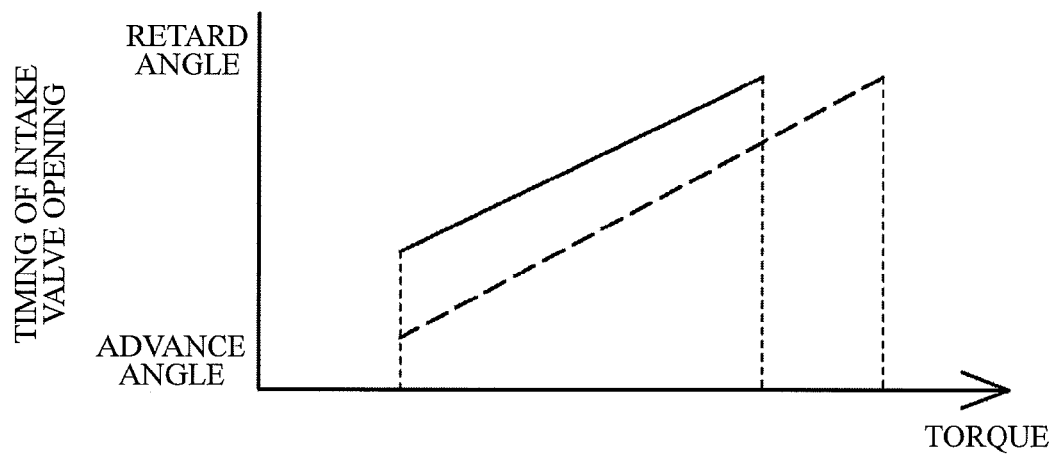
Figure 36C:
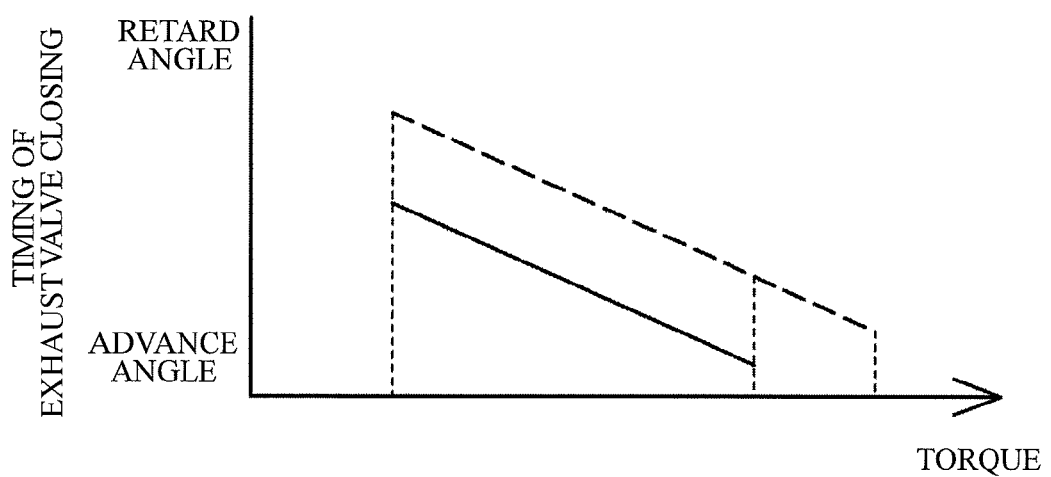

FIGS. 36(a) through 36(c) are diagrams of a relationship between torque (load) and the amount of overlap in the embodiment and the comparative example. FIG. 36(a) is a diagram of a comparison in terms of the amount of overlap. FIG. 36(b) is a diagram of a comparison in terms of the timing of the opening of the intake valves 19 (IVO). FIG. 36(c) is a diagram of a comparison in terms of the timing of the closing of the exhaust valves (EVC).

First, as to the comparison in terms of the timing of the opening of the intake valves 19 in FIG. 36(b), the embodiment sets the timing of the opening of the intake valves 19 later than the comparative example (retard side). As to the comparison in terms of the timing of the closing of the exhaust valves in FIG. 36(c), the embodiment sets the closing timing of the exhaust valves earlier than those of the comparative example (advance side). As a result, as illustrated in FIG. 36(a), the embodiment has a smaller amount of overlap than the comparative example. This makes it possible to prevent blow-back of air taken into the intake port from increasing and to prevent the in-cylinder temperature due to increase of the internal EGR from increasing. As illustrated as $OL_1$ and $OL_2$ in FIG. 36(a), the tolerance of the amount of overlap at low loads is determined by the depth of a recess provided in a piston head. At high loads, the internal EGR does not increase transiently, and increase of smoke can be suppressed. The control device for the internal combustion engine of Embodiment 4 may have a structure similar to that of the control device 200 of Embodiment 2.

Embodiment 5

Opening Exhaust Valve Twice

A description is now given of Embodiment 5. An operation of opening an exhaust valve twice in Embodiment 5 is described. An internal combustion engine of Embodiment 5 is a four-valve internal combustion engine that has two intake valves and two exhaust valves per cylinder. The control device 100 previously described in the other embodiments is incorporated into the internal combustion engine. Since the other structures are similar to those of the Embodiment 1, similar reference numerals are given to similar structures, and a detailed description thereof is omitted. The insides of the cylinders of the internal combustion engine 1 are configured to generate swirl. Swirl may be generated by any of a method based on the structure of the intake ports, a method of controlling the timing of the opening of the intake valves, and another method. Further, the internal combustion engine of Embodiment 5 is provided with a mechanism of opening an exhaust valve on the intake stroke in addition to the normal exhaust stroke. This mechanism is realized by a method of providing a cam with multiple nose parts or a method of changing the rotation speed of the cam. Particularly, since the embodiment has a larger magnitude of lift than the comparative example, swirl of the embodiment tends to be strengthened. Thus, the embodiment has an increasing demand for weakening swirl at low loads, compared to the comparative example.

Figure 37:
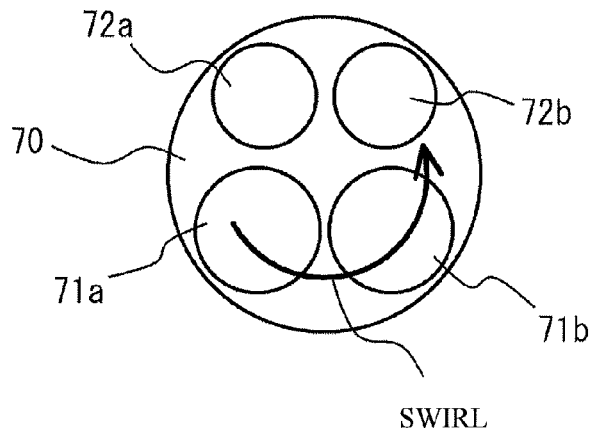
FIG. 37 is a diagram of a swirl flow observed when a cylinder of the internal combustion engine is seen in the axial direction.
Figure 38:
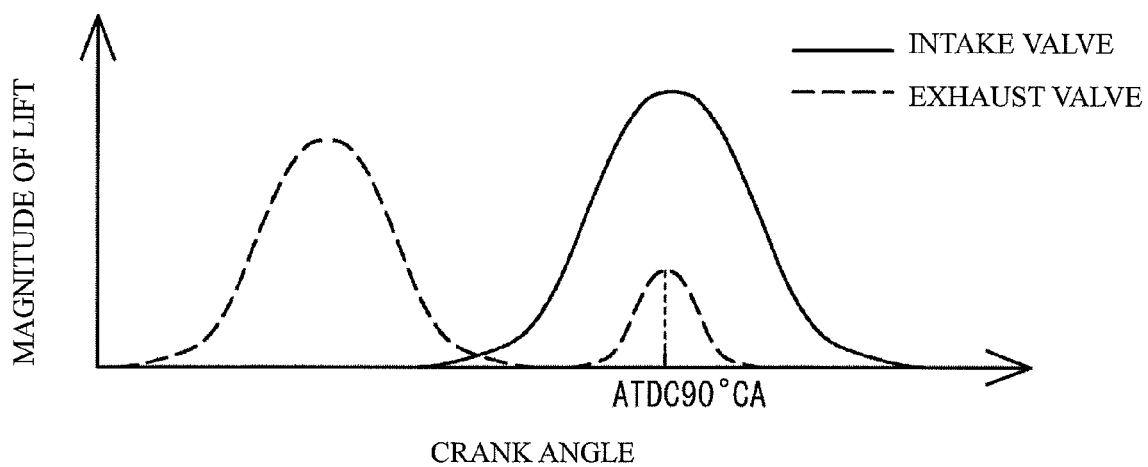
FIG. 38 is a diagram of lift curves of intake valves and a lift curve of one exhaust valve.
Figure 39:
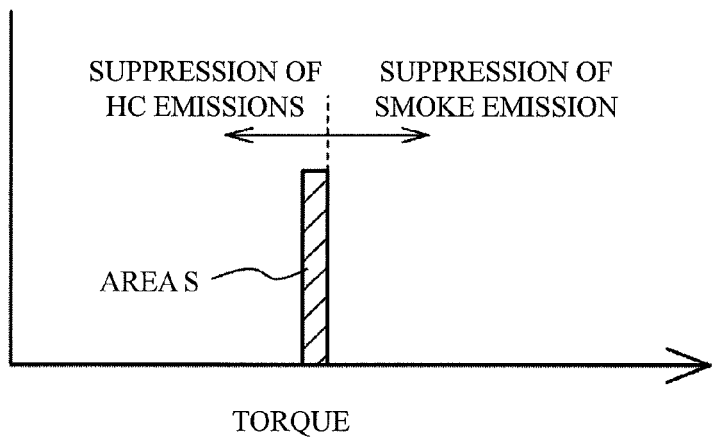
FIG. 39 is a diagram of a region in which the exhaust valve is opened during the intake stroke.

FIG. 37 is a diagram of a swirl flow observed when the cylinder 70 of the internal combustion engine 1 is viewed axially. In FIG. 37, there are illustrated intake ports 71a and 71b and exhaust ports 72 and 72b. FIG. 38 is a diagram of lift curves of the intake valves and the exhaust valve on the exhaust port 72b. A solid line is a lift curve of the intake valves, and a broken line is a lift curve of the exhaust valve. FIG. 39 is a diagram of an execution region S in which the exhaust valve is opened on the intake stroke.

As illustrated in FIG. 37, a counterclockwise swirl is generated in the cylinder 70. Under rich combustion conditions at low loads, the exhaust valve on the exhaust port 72b out of the adjacent exhaust ports that is located upstream in the swirl flow is driven along the lift curve illustrated in FIG. 38. Thus, the exhaust port is opened on the intake stroke so as to be countercurrent to the flow of swirl. Thus, air (EGR gas) flows in the cylinder from the exhaust port and cancels the flow of swirl. Since the swirl in the cylinder is suppressed in the above manner, cooling loss is reduced and the in-cylinder temperature is maintained, whereby misfiring is suppressed. The opening timing of the exhaust valve on the intake stroke is selected so as to be located at an angle that retards by 90° from the top-dead-center (ATDC90° CA). At ATDC90° CA, the speed of the piston becomes the fastest. That is, the timing having the maximum magnitude of lift of the exhaust valve and the timing having the fastest speed of the piston are the same. Thus, the amount of air that flows from the exhaust port increases, and swirl is cancelled highly effectively.

In contrast, since swirl should be strengthened when the internal combustion engine operates at high loads, the driving of the exhaust valve illustrated in FIG. 38 is not employed. As illustrated in FIG. 39, the operation of opening the exhaust valve on the intake stroke is performed in the region S in which HC emissions can be suppressed. In a torque region in which it is required to suppress smoke emissions, the operation of opening the exhaust valve on the intake stroke is not performed.

Embodiment 6

Control of Making Intake Valve Closing Timing Constant

Figure 40:
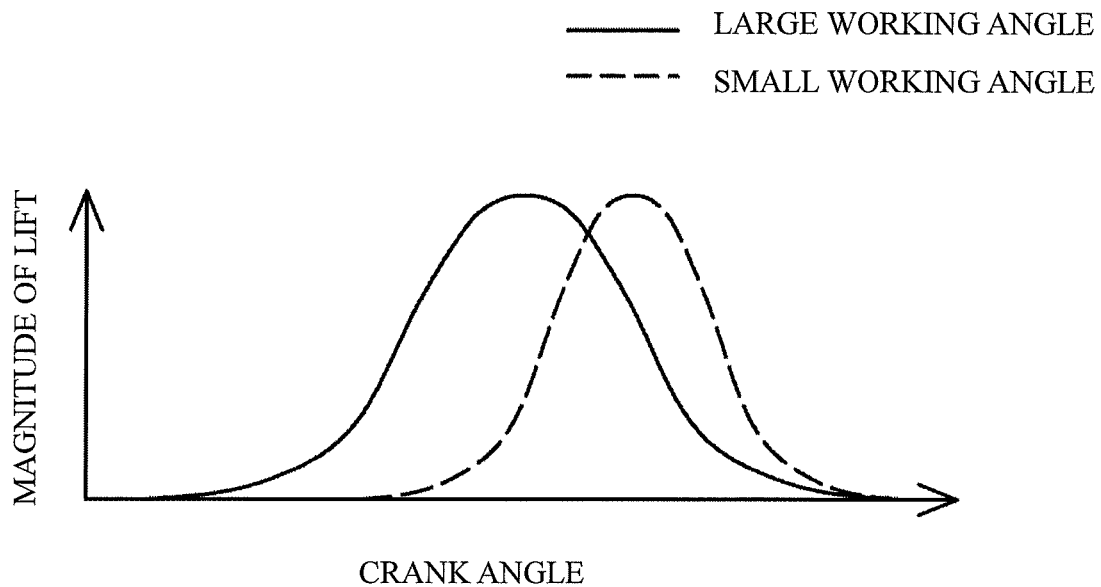
FIG. 40 is a diagram of a lift curve of the intake valves in Embodiment 6.
Figure 41:
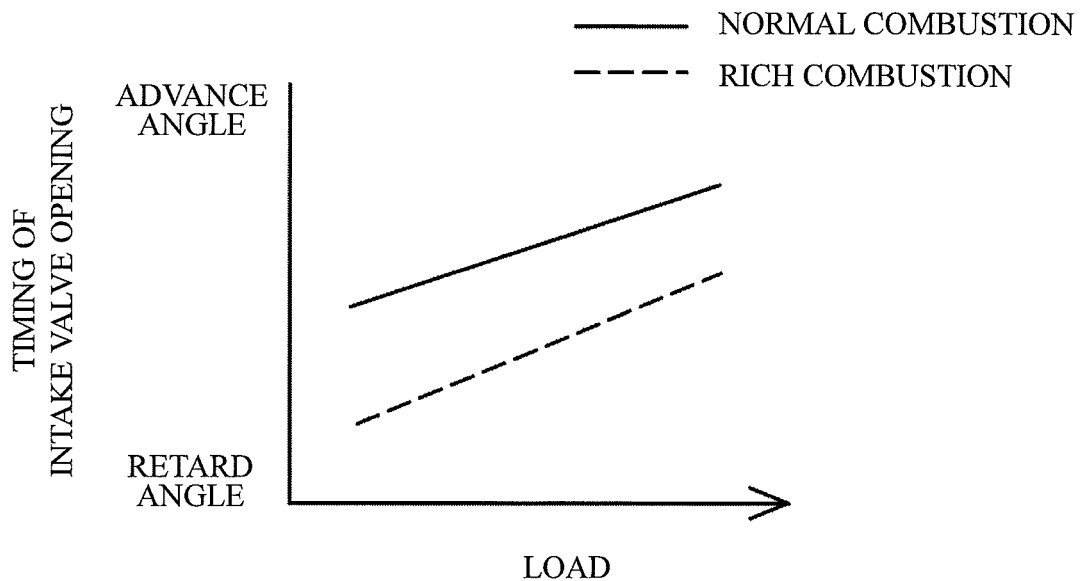
FIG. 41 is a diagram of a relationship between the timing of the opening of the intake valves and load in Embodiment 6.

A description is now given of Embodiment 6. A control device for an internal combustion engine of Embodiment 6 is almost the same as the control device 100 of Embodiment 1. However, the variable valve driving mechanism 10 in the internal combustion engine of Embodiment 6 has a structure different from that in Embodiment 1. FIG. 40 indicates lift curves of the intake valves of Embodiment 6. A solid line in FIG. 40 indicates a lift curve at a large working angle, and a broken line indicates a lift curve at a small working angle. As illustrated in FIG. 40, the variable valve driving mechanism of Embodiment 6 is structured to change the working angle while keeping IVC constant. Further, IVC that is made constant is selected so as to have a condition that the real compression ratio is the maximum. FIG. 41 is a diagram of a relationship between the timing of the intake valve opening (IVO) and load (average effective pressure). A solid line in FIG. 41 indicates a state during normal combustion, and a broken line indicates a state during rich combustion. As illustrated in FIG. 41, the control device retards IVO to reduce the working angle as the load increases. This is because there is a requirement for securing a certain amount of intake air at high loads. The control device retards IVO more greatly during rich combustion to reduce the working angle of the intake valves than that during normal combustion.

Figure 42:
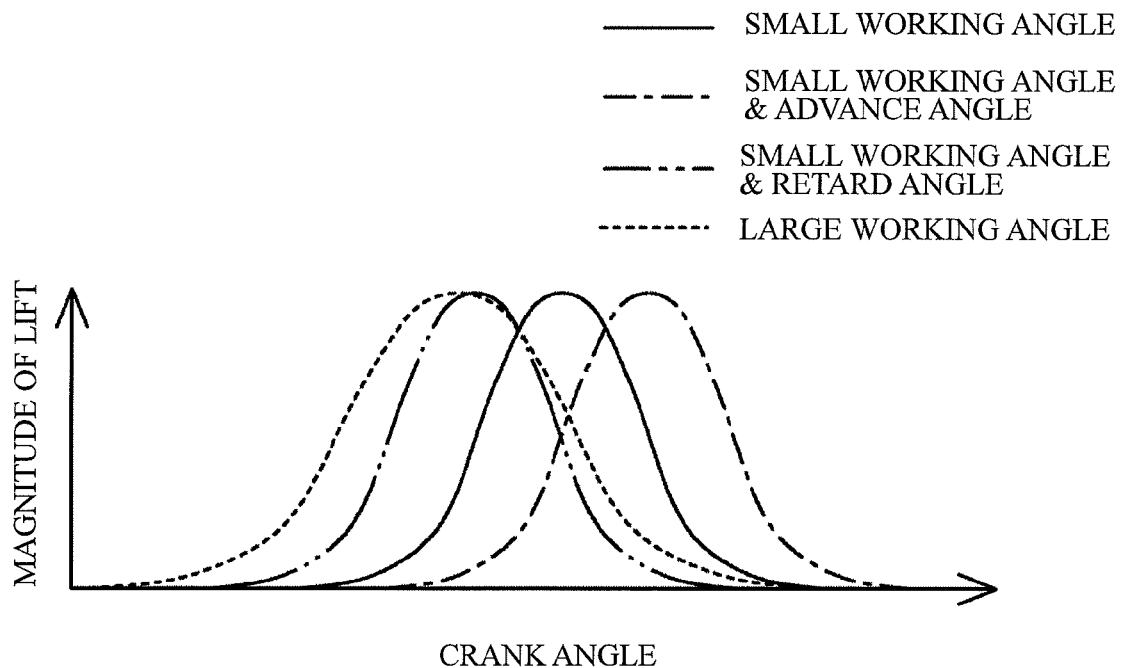
FIG. 42 is a diagram of a lift curve when the phase of the duration of the intake valve opening is changed by a VVT mechanism.
Figure 43:
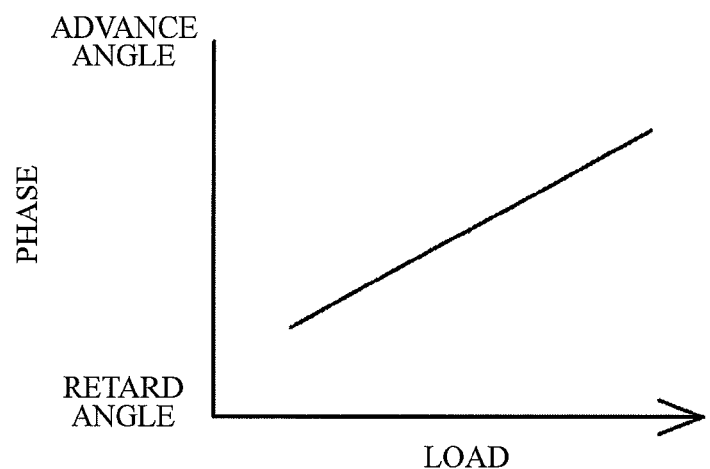
FIG. 43 is a diagram of a map for setting the phase of the duration of the intake valve opening with respect to the load on the internal combustion engine.

Since a low compression ratio is required at high loads, the phases of the duration of the opening of the intake valves 19 may be changed by the VVT mechanism 16 in order to realize a low compression ratio at high loads. Now, a description is given of the changing of the phases of the duration of the opening of the intake valves 19. FIG. 42 indicates lift curves observed when the phases of the duration of the opening of the intake valves 19 are changed by the VVT mechanism 16. A solid line in FIG. 42 indicates a lift curve at a small working angle. A one-dot chain line indicates an advanced phase of the lift curve of the solid line, and a two-dot chain line indicates a retarded phase of the lift curve of the solid line. A dotted line indicates a lift curve at a large working angle. FIG. 43 is diagram of a map used to set the phases of the duration of the opening of the intake valves 19 with respect to the load (average effective pressure) on the internal combustion engine 1. As illustrated in FIG. 43, as the load on the internal combustion engine 1 increases, the phases of the duration of the opening of the intake valves 19 are changed to advance more. In the structure of Embodiment 6, during normal combustion, swirls in the cylinders 5 are strengthened when the phases of the duration of the opening of the intake valves 19 are advanced, and are weakened when the phases are retarded adversely. Thus, the phases of the duration of the opening of the intake valves 19 are advanced when the load increases and it is requested to increase the swirls. In contrast, the phases of the duration of the opening of the intake valves 19 are retarded when the load decreases and it is requested to weaken the swirls. By adjusting the swirls in that manner, combustion is facilitated and misfiring can be suppressed.

Embodiment 7

Avoidance of Jumping of Intake Valves

Figure 44:
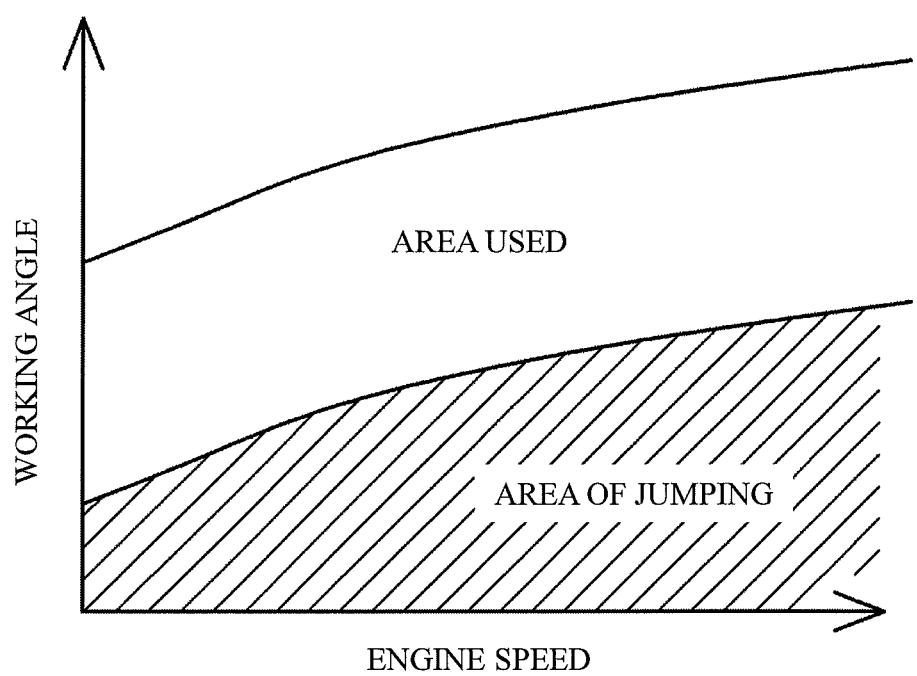
FIG. 44 is an exemplary map formed to avoid jumping of the intake valves.

A description is now given of Embodiment 7. In Embodiment 7, avoidance of jumping of the intake valves 19 is described. A control device for an internal combustion engine of Embodiment 7 is similar to the control device 100 of Embodiment 1. The control device for the internal combustion engine of Embodiment 7 may be the control device 200 of Embodiment 2. Hereinafter, similar reference numerals are given to similar structures and a detailed description of similar structure elements is omitted. In the embodiments, if the working angles are too small, the intake valves 19 will jump. Thus, the working angles are selected so as to avoid jumping of the intake valves 19. FIG. 44 illustrates an exemplary map formed to avoid jumping of the intake valves 19. The vertical axis of FIG. 44 indicates the working angles of the intake valves 19, and the horizontal axis denotes the speed of the internal combustion engine 1. Since the intake valves 19 jump in an area with oblique lines in FIG. 44, the working angles of the intake valves 19 are selected so as not to operate in the area. It is thus possible to suppress misfiring at the time of switching to rich combustion and to suppress jumping of the intake valves 19.

It is apparent from the above that above embodiments are just examples for carrying out the invention, and the present invention is not limited to these but the embodiments may be varied variously within the scope of the invention and that other various embodiments may be made within the scope of the present invention.

DESCRIPTION OF NUMERALS

1 Internal combustion engine
4 ECU
6 Fuel injection valve
9 Reduction catalyst
10 Variable valve driving mechanism
19 Intake valve
100 Control device

The invention claimed is:

1. A control device for an internal combustion engine comprising:
   a variable valve driving mechanism configured to change a working angle of an intake valve while keeping a maximum magnitude of lift and opening timing constant;
   a reduction catalyst which absorbs nitrogen oxide in exhaust during lean combustion and reduces the nitrogen oxide absorbed during rich combustion; and
   a control unit changing, according to a load on the internal combustion engine, an amount of advance of a timing of closing of the intake valve at a time of switching to rich combustion.

2. The control device according to claim 1, wherein the control unit increases the amount of advance as the load on the internal combustion engine decreases.

3. The control device according to claim 1, wherein the control unit advances the timing of the closing of the intake valve and then increases a fuel injection amount at the time of switching to rich combustion.

4. The control device according to claim 1, wherein:
   the variable valve driving mechanism is configured to change a phase of the intake valve in addition to changing of the working angle of the intake valve; and
   the variable valve driving mechanism maximizes lift of the intake valve at a crank angle at which a flow rate of intake air becomes a maximum.

5. The control device according to claim 1, wherein:
   the control device is a control device for an internal combustion engine having two exhaust ports or more per cylinder; and
   the control device opens one of the two exhaust ports or more located upstream in a swirl flow on an intake stroke during a low-load operation of the internal combustion engine.

* * * * *